US012810627B2

(12) United States Patent
Hiei

(10) Patent No.: US 12,810,627 B2
(45) **Date of Patent: *Nov. 24, 2026**

(54) PARKING ASSIST APPARATUS

(71) Applicant: TOYOTA JIDOSHA KABUSHIKI KAISHA, Toyota (JP)

(72) Inventor: Yu Hiei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

This patent is subject to a terminal disclaimer.

(21) Appl. No.: 18/811,339

(22) Filed: Aug. 21, 2024

(65) Prior Publication Data

US 2024/0412533 A1 Dec. 12, 2024

Related U.S. Application Data

(63) Continuation of application No. 18/132,033, filed on Apr. 7, 2023, now Pat. No. 12,100,227, which is a continuation of application No. 17/064,050, filed on Oct. 6, 2020, now Pat. No. 11,651,596.

(30) Foreign Application Priority Data

Oct. 11, 2019 (JP) ................................ 2019-187483

(51) Int. Cl.
*G06V 20/58* (2022.01)
*B60W 30/06* (2006.01)
*G08G 1/14* (2006.01)
*G08G 1/16* (2006.01)

(52) U.S. Cl.
CPC ........... *G06V 20/586* (2022.01); *B60W 30/06* (2013.01); *G08G 1/168* (2013.01); *B60W 2420/403* (2013.01); *G08G 1/143* (2013.01)

(58) Field of Classification Search
CPC ................ G06V 20/586; B60W 30/06; B60W 2420/42; G08G 1/168; G08G 1/143
See application file for complete search history.

(56) References Cited

U.S. PATENT DOCUMENTS 10,507,787 B2 * 12/2019 Ferguson ............. G05D 1/0276
10,606,257 B2 * 3/2020 Kim ...................... B60W 30/06
11,085,791 B2 * 8/2021 Saxena .............. G06V 10/7553
(Continued)

FOREIGN PATENT DOCUMENTS

CN 101573257 A * 11/2009 ........... B62D 15/028
CN 108617167 A * 10/2018 ............... G08G 1/09
(Continued)

OTHER PUBLICATIONS

Translation of CN-101573257-A, 28 pages (Year: 2009).*
(Continued)

*Primary Examiner* — Dale W Hilgendorf
(74) *Attorney, Agent, or Firm* — Sughrue Mion, PLLC

(57) ABSTRACT

A parking assist apparatus including a controller configured to perform operations including image feature extraction, parking feature registration, identification of a parking position from the registered parking features, performance of parking assistance based on the identified parking position, and erasure of registered parking features based on non-detection of the parking features during the performance of parking assistance.

9 Claims, 31 Drawing Sheets

(56) References Cited

U.S. PATENT DOCUMENTS

| | | | | |
|---|---|---|---|---|
| 11,651,596 | B2 * | 5/2023 | Hiei | B60W 30/06 701/117 |
| 11,724,742 | B2 * | 8/2023 | Feijoo | B62D 15/0285 701/41 |
| 12,100,227 | B2 * | 9/2024 | Hiei | G06V 20/586 |
| 2008/0164974 | A1 * | 7/2008 | Cochran | G07C 9/257 340/5.82 |
| 2011/0298926 | A1 | 12/2011 | Katsunaga et al. | |
| 2012/0148020 | A1 * | 6/2012 | Arroyo, Jr. | G01V 5/223 378/57 |
| 2013/0162825 | A1 * | 6/2013 | Yoon | G06V 20/586 348/148 |
| 2013/0265428 | A1 | 10/2013 | Yoon et al. | |
| 2014/0152780 | A1 * | 6/2014 | Kanetake | G06T 7/579 348/50 |
| 2014/0341344 | A1 * | 11/2014 | Arroyo, Jr. | G01V 11/00 378/57 |
| 2015/0033305 | A1 * | 1/2015 | Shear | G06F 21/57 726/11 |
| 2015/0339535 | A1 * | 11/2015 | Utagawa | G06T 7/73 348/118 |
| 2016/0071415 | A1 * | 3/2016 | Maeda | B60R 1/23 348/148 |
| 2016/0371983 | A1 * | 12/2016 | Ronning | B62D 15/027 |
| 2017/0253236 | A1 * | 9/2017 | Hayakawa | B60W 30/06 |
| 2018/0052462 | A1 * | 2/2018 | Arena | H04W 4/029 |
| 2018/0093664 | A1 * | 4/2018 | Kim | B60W 30/06 |
| 2018/0246515 | A1 * | 8/2018 | Iwama | G05D 1/0251 |
| 2019/0039605 | A1 | 2/2019 | Iio et al. | |
| 2019/0184981 | A1 * | 6/2019 | Jung | B60W 30/06 |
| 2019/0220997 | A1 | 7/2019 | Asai et al. | |
| 2019/0265703 | A1 * | 8/2019 | Hicok | B60W 60/00253 |
| 2019/0329761 | A1 * | 10/2019 | Kim | B60W 30/06 |
| 2019/0392229 | A1 * | 12/2019 | Yamamoto | G06V 20/586 |
| 2020/0074192 | A1 * | 3/2020 | Ogata | G08G 1/16 |
| 2020/0339195 | A1 * | 10/2020 | Feijoo | B62D 15/0285 |
| 2020/0355515 | A1 * | 11/2020 | Saxena | G06V 20/176 |
| 2021/0001810 | A1 * | 1/2021 | Rivard | G06V 40/172 |
| 2021/0073367 | A1 * | 3/2021 | Kim | B60R 25/24 |
| 2021/0206391 | A1 * | 7/2021 | Sakano | G01C 21/3602 |
| 2021/0252715 | A1 * | 8/2021 | Javidan | H04W 4/029 |
| 2021/0256466 | A1 * | 8/2021 | Javidan | H04W 4/029 |
| 2021/0256472 | A1 * | 8/2021 | Javidan | H04W 4/025 |
| 2022/0009552 | A1 | 1/2022 | Sakai et al. | |
| 2022/0204039 | A1 * | 6/2022 | Kang | B60W 60/0016 |
| 2022/0222948 | A1 * | 7/2022 | Lindberg Nilsson | G06V 20/52 |
| 2022/0237927 | A1 * | 7/2022 | Hiei | G06V 10/60 |
| 2024/0367642 | A1 * | 11/2024 | Suzuki | B60W 50/08 |

FOREIGN PATENT DOCUMENTS

| | | | |
|---|---|---|---|
| DE | 10 2012 223 730 | A1 | 10/2013 |
| DE | 10 2017 123 848 | A1 | 4/2019 |
| JP | 2010211277 | A | 9/2010 |
| JP | 2017-138664 | A | 8/2017 |
| JP | 2019132664 | A1 | 8/2019 |

OTHER PUBLICATIONS

Translation of CN-108617167-A, 22 pages (Year: 2018).*
Translation of CN-101573257-A, 22 pages (Year: 2009).
Translation of CN-108617167-A, 19 pages (Year: 2018).

* cited by examiner

PARKING ASSIST APPARATUS

CROSS REFERENCE TO RELATED APPLICATION

This is a continuation of U.S. application Ser. No. 18/132,033, filed Apr. 7, 2023, which is now U.S. Pat. No. 12,100,227 issued on Sep. 24, 2024, which is a continuation of U.S. patent application Ser. No. 17/064,050, filed Oct. 6, 2020, which is now U.S. Pat. No. 11,651,596 issued on May 16, 2023, which claims priority to Japanese Application 2019-187483, filed Oct. 11, 2019. The entire disclosures of the prior applications are considered part of the disclosure of the accompanying continuation application, and are hereby incorporated by reference.

TECHNICAL FIELD

The present invention relates to a parking assist apparatus for controlling a vehicle in such a manner that the vehicle automatically moves to a parking position registered in advance and stops there.

BACKGROUND ART

Japanese Patent Application Laid-Open No. 2017-138664 discloses a automatic driving control apparatus (hereinafter, referred to as a "conventional apparatus") configured to extract, based images captured while the vehicle is moving, feature points existing at structures located in a fixed manner around a target place of a vehicle.

This conventional apparatus identifies a position of each of the structures based on the feature points included in the captured images (that is, by detecting the feature points), and calculates, by setting each of the structures as a landmark, a position of the vehicle where the automatic driving is in operation. According to this configuration, it is described that it becomes possible to automatically park the vehicle in the target place by the automatic driving even when there is no parking frame line for defining the target place.

SUMMARY OF THE INVENTION

According to the configuration of the conventional apparatus, there may be a case where feature points cannot be detected and as a result, a position of each of the structures cannot be properly identified. That is, in the conventional apparatus, the feature points are extracted based on the images captured while the vehicle is moving, and thus, when, for instance, shade is present in these images, it is likely that a feature point(s) including the shade may be extracted. In this case, if captured images acquired later on do not include any shade, it is highly likely that the conventional apparatus cannot detect the feature point(s) from the captured images. In addition, for example, when a structure at a position corresponding to an extracted feature point has got dirty with time, it is highly likely that the conventional apparatus cannot detect this feature point from the captured images because a condition of the structure has changed since when this feature point was extracted.

As described above, when an inappropriate feature point(s) is extracted at a timing of extracting feature points, or when a condition of a structure has changed with time later on even though an appropriate feature point(s) was extracted, a position of the structure cannot be properly identified because it is impossible to detect such a feature point(s), and as a result, it may become impossible to park the vehicle in the target place by the automatic driving.

The present invention is made to resolve the problem above. That is, one of objects of the present invention is to provide a parking assist apparatus (hereinafter, may be also referred to as a "present invention apparatus") capable of properly parking a vehicle in a registered parking position even when a feature point(s) comes not to be detected due to extraction of an inappropriate feature point(s) or change of a condition of a position with time, the position corresponding to a feature point(s).

A present invention apparatus comprising:

- a camera (21) capable of taking an image of a surrounding of a vehicle (SV); and
- a controller (10) configured to:
  - extract feature points (F (Fe, Fi, Fp)) from a captured image where a region (PL) in which a driver of the vehicle (SV) desires to register a parking position and a vicinity thereof are captured,
  - register the extracted feature points (F) in association with the parking position, and thereby register the parking position as a registered parking position (Ppark_reg),
  - when it is determined that at least one of the feature points (F) is detectable from said captured image acquired from the imaging apparatus (21) in a case when the vehicle (SV) is positioned in said vicinity of the registered parking position (Ppark_reg), calculate the registered parking position (Ppark_reg) by detecting the at least one of the feature points (F), and
  - perform, as parking assist control, either one of control for automatically parking the vehicle (SV) in the calculated registered parking position (Ppark_reg) or control for assisting in parking the vehicle (SV) in the calculated registered parking position (Ppark_reg),
- wherein,
- the controller (10) is configured to:
  - when a non-detected situation has occurred consecutively a predetermined number of times, the non-detected situation being a situation where one or more feature points (F) among the registered feature points (F) are not detected even once from the captured image while the parking assist control is being performed, erase the one or more feature points (F) from a group of the registered feature points (F),
  - newly extract a same number of feature points (F) as the erased one or more feature points (F) from the captured image, and
  - register the newly extracted one or more feature points (F) in association with the registered parking position (Ppark_reg).

When a feature point(s) extracted by the controller is inappropriate, and when a condition of a position has changed with time even though an appropriate feature point(s) was extracted, the position corresponding to this feature point(s), it is highly likely that the non-detected situation (a situation where a feature point(s) among the registered feature points is not detected even once from a captured image while the parking assist control is being performed) will occur consecutively because this feature point(s) will not be detected from the captured image while the parking assist control is being performed. When the non-detected situation has occurred consecutively a predetermined number of times, the present invention apparatus erases the feature point(s) from a group of the registered feature points, newly extracts the same number of feature point(s) as the erased feature point(s) from the captured image, and registers the extracted feature point(s) in association with the registered parking position. Therefore, it can be prevented that a number of the detectable feature points continues to decrease. Accordingly, it becomes possible to calculate the registered parking position with high accuracy based on the detectable feature points, and as a result, it becomes possible to properly park the vehicle in the registered parking position.

In addition, according to the configuration above, the non-detected situation occurs also when a feature point(s) is not included in a capturing area of the captured image even once while the parking assist control is being performed. Therefore, a distribution area of the feature points can be updated each time to an area where a driver's habit is more reflected. As a result, it becomes possible to always maintain a calculation accuracy of the registered parking position at a high level.

In another aspect of the present invention, when the non-detected situation has occurred consecutively said predetermined number of times, the controller (10) is configured to newly extract a feature point (F) from each predetermined area where each of the erased feature points (F) is included.

According to this configuration, it becomes possible to set a "distribution area of feature points after a feature point(s) is newly extracted" in a substantially same area as a "distribution area of feature points before a feature point(s) is erased" by properly setting the predetermined area. Therefore, it becomes possible to reduce a possibility that the calculation accuracy of the registered parking position decreases owing to a feature point(s) being newly extracted.

In another aspect of the present invention, when the non-detected situation has occurred consecutively said predetermined number of times, the controller (10) is configured to newly extract said feature point (F) from a same divided region as a divided region where each of the erased feature points (F) is included among divided regions, each being defined by dividing the captured image into a plurality of regions.

According to this configuration, it becomes possible to set a "distribution area of feature points after a feature point(s) is newly extracted" in a substantially same area as a "distribution area of feature points before a feature point(s) is erased". Therefore, it becomes possible to reduce a possibility that the calculation accuracy of the registered parking position decreases owing to a feature point(s) being newly extracted.

In another aspect of the present invention, the controller (10) is configured to:

divide the captured image into a plurality of divided regions, extract at least one feature point (F) from each of the plurality of divided regions, and register the extracted feature points (F) in association with the parking position.

The registered parking position is calculated based on the detected feature point(s). The calculation accuracy of the registered parking position becomes higher as the detectable feature points are distributed in a more dispersive manner within a captured image. According to the configuration above, at least one feature point is extracted from each of the plurality of divided regions, and therefore it is likely that the detectable feature points are distributed in a dispersive manner within the captured image. As a result, it becomes possible to calculate the registered parking position with high accuracy.

In another aspect of the present invention, when the non-detected situation has occurred owing to a feature point (Fo) not being included in a capturing area (81 to 84) of the captured image, the controller (10) is configured not to erase this feature point (Fo) from said group of the registered feature points.

When the feature point is not detected owing to this feature point not being included in the capturing area of the captured image, there is a possibility that this feature point may be detected by a position of the captured image changing in the parking assist control performed later and thereby this feature point being included in the capturing area of the captured image. That is, unlike a case where a feature point is not detected in the parking assist control performed later owing to an inappropriate feature point having been detected, and when a feature point is not detected in the parking assist control performed later owing to a condition of a position corresponding to a feature point having changed with time, a feature point mentioned above is qualified as a feature point. According to the configuration above, even when the non-detected situation has occurred for such a feature point, this feature point is not erased from a group of the registered feature points. Therefore, it becomes possible to selectively erase only a feature point(s) which is not obviously qualified.

In the above description, references used in the following descriptions regarding embodiments are added with parentheses to the elements of the present invention, in order to assist in understanding the present invention. However, those references should not be used to limit the scope of the invention.

DESCRIPTION OF THE EMBODIMENT

<Configuration>

Figure 1:
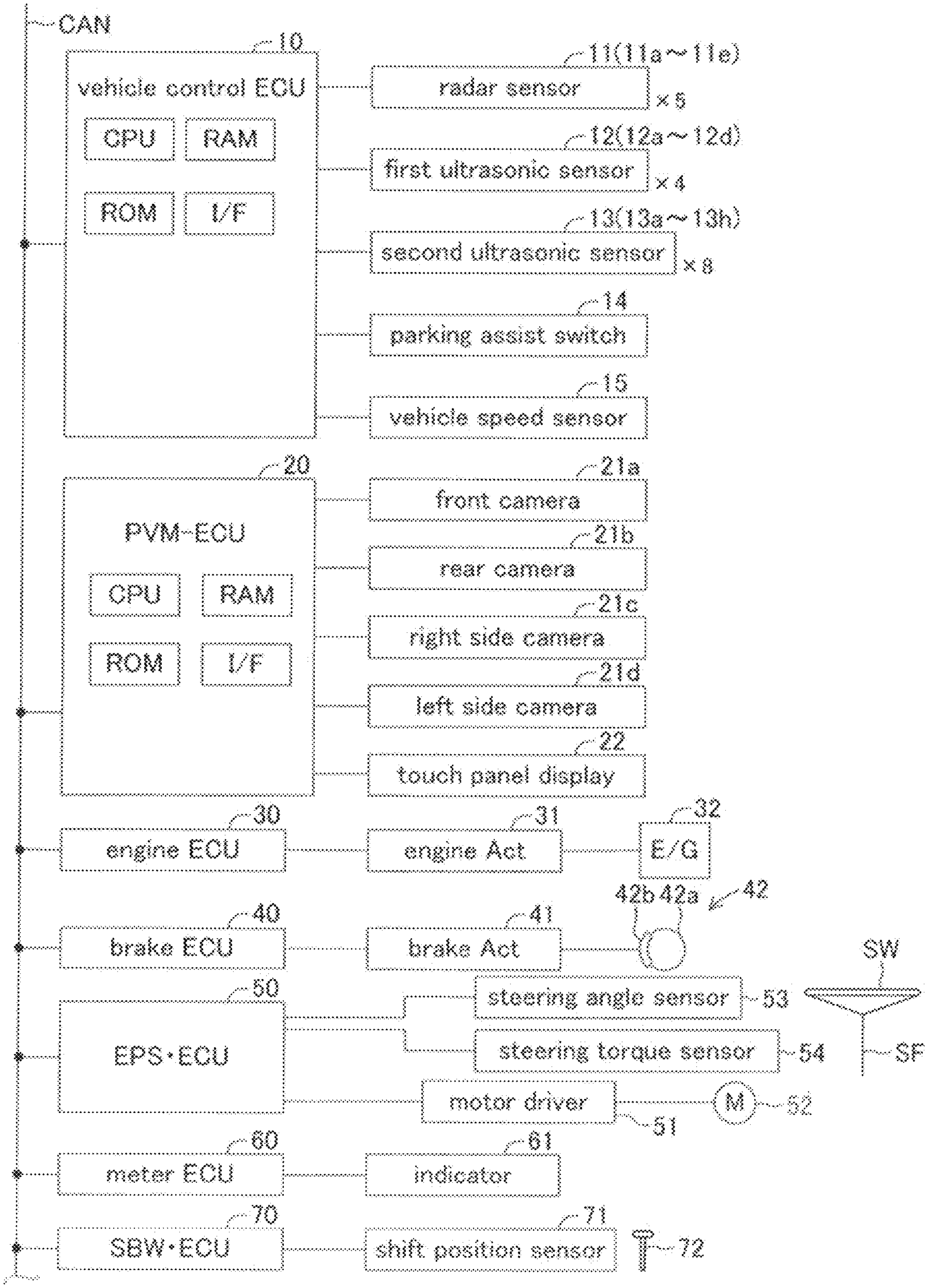
FIG. 1 is a schematic configuration diagram of a parking assist apparatus according to an embodiment of the present invention.

A parking assist apparatus according to an embodiment of the present invention (hereinafter, referred to as a "present embodiment apparatus") is applied to a vehicle SV (refer to FIG. 2). As shown in FIG. 1, the first embodiment apparatus comprises vehicle control ECU 10, PVM (Panoramic View Monitor)—ECU 20, engine ECU 30, brake ECU 40, EPS (Electrically-driven Power Steering)•ECU 50, meter ECU 60, and SBW (Shift-by-Wire)•ECU 70. Hereinafter, the vehicle control ECU 10 may be also simply referred to as "VC (Vehicle Control) ECU".

Each ECU includes a microcomputer. This microcomputer includes CPU, ROM, RAM, readable/writable non-volatile memory, interfaces, and the like. The CPU realizes (performs) various functions (mentioned later) by executing instructions (i.e. programs, routines) stored in the ROM. Further, these ECUs are connected to each other in such a manner that they can mutually exchange data (communicate) via a CAN (Controller Area Network). Therefore, detected values etc. of sensors (including switches) connected to a specific ECU may be transmitted to other ECUs.

Radar sensors 11*a* to 11*e*, first ultrasonic sensors 12*a* to 12*d*, second ultrasonic sensors 13*a* to 13*h*, a parking assist switch 14 and a vehicle speed sensor 15 are connected to the VCECU.

It should be noted that when there is no need to distinguish the radar sensors 11*a* to 11*e* from each other, they will be referred to as a "radar sensor 11". Similarly, when there is no need to distinguish the first ultrasonic sensors 12*a* to 12*d* from each other, they will be referred to as a "first ultrasonic sensor 12". When there is no need to distinguish the second ultrasonic sensors 13*a* to 13*h* from each other, they will be referred to as a "second ultrasonic sensor 13".

The radar sensor 11 is a well-known sensor making use of radio wave in a millimeter waveband. The radar sensor 11 acquires object information identifying a distance between a vehicle SV and a three-dimensional object, a relative speed of the three-dimensional object with respect to the vehicle SV, a relative position (direction) of the three-dimensional object with respect to the vehicle SV, and the like and outputs the object information to the VCECU.

Figure 2:
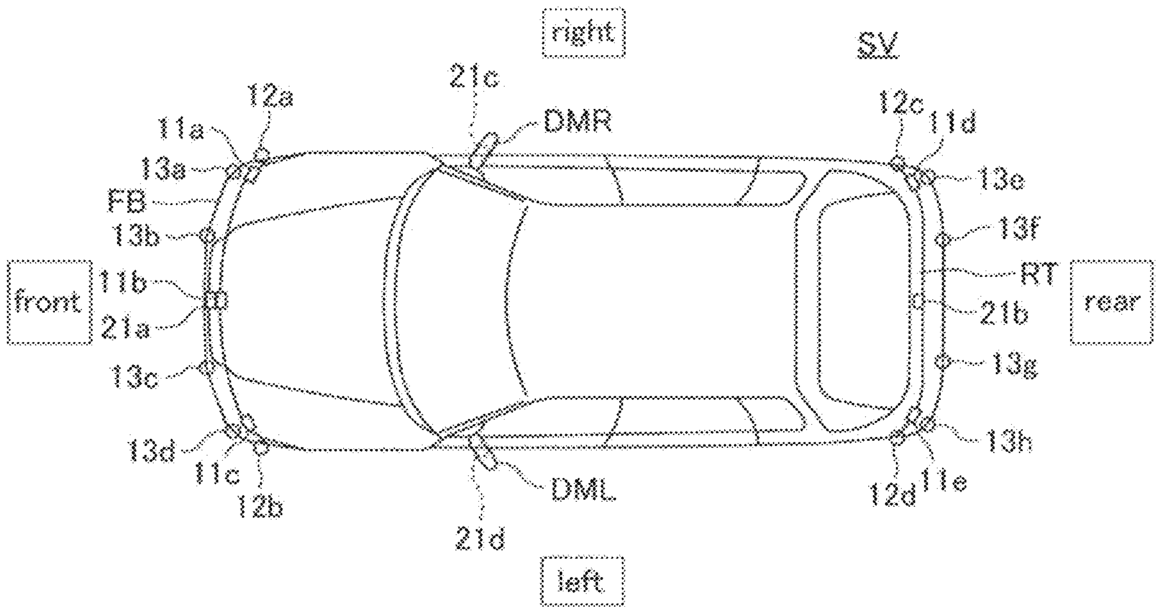
FIG. 2 is a plan view of a vehicle illustrating arrangements of a radar sensor, a first ultrasonic sensor, a second ultrasonic sensor, and a camera.

Each of the radar sensors 11*a* to 11*e* is arranged at a predetermined position of the vehicle SV as shown in FIG. 2 and acquires the object information of a three-dimensional object existing in a predetermined region described below.

The radar sensor 11*a* acquires the object information of a three-dimensional object existing in a right front region of the vehicle SV.

The radar sensor 11*b* acquires the object information of a three-dimensional object existing in a front region of the vehicle SV.

The radar sensor 11*c* acquires the object information of a three-dimensional object existing in a left front region of the vehicle SV.

The radar sensor 11*d* acquires the object information of a three-dimensional object existing in a right rear region of the vehicle SV.

The radar sensor 11*e* acquires the object information of a three-dimensional object existing in a left rear region of the vehicle SV.

Each of the first ultrasonic sensor 12 and the second ultrasonic sensor 13 is a well-known sensor making use of ultrasonic wave. When there is no need to distinguish the first ultrasonic sensor 12 and the second ultrasonic sensor 13 from each other, they will be collectively referred to as an "ultrasonic sensor".

The ultrasonic sensor transmits ultrasonic wave to a predetermined area, receives reflected wave reflected from a three-dimensional object, and detects, based on a time from a timing of transmission to a timing of reception, whether or not a three-dimensional object exists as well as a distance to the three-dimensional object. The first ultrasonic sensor 12 is used to detect a three-dimensional object positioned at a relatively farther position from the vehicle SV, compared to the second ultrasonic sensor 13. Each of the first ultrasonic sensor 12 and the second ultrasonic sensor 13 is arranged at a predetermined position of a vehicle body of the vehicle SV as shown in FIG. 2.

The first ultrasonic sensor 12 (12*a* to 12*d*) acquires a distance between the first ultrasonic sensor 12 and a three-dimensional object existing in a predetermined region (a detection region) described below, and transmits information on the acquired distance to the VCECU.

A detection region of the first ultrasonic sensor 12*a* is a front right region of the vehicle SV.

A detection region of the first ultrasonic sensor 12*b* is a front left region of the vehicle SV.

A detection region of the first ultrasonic sensor 12*c* is a rear right region of the vehicle SV.

A detection region of the first ultrasonic sensor 12*d* is a rear left region of the vehicle SV.

The second ultrasonic sensor 13 (13*a* to 13*h*) acquires a distance between the second ultrasonic sensor 13 and a three-dimensional object existing in a predetermined region (a detection region) described below, and transmits information on the acquired distance to the VCECU.

A detection region of each of the second ultrasonic sensors 13*a* to 13*d* is a front region of the vehicle SV.

A detection region of each of the second ultrasonic sensors 13*e* to 13*h* is a front region of the vehicle SV.

The parking assist switch 14 is a switch operated (pressed) by a driver.

The vehicle speed sensor 15 is configured to detect a vehicle speed of the vehicle SV and output a signal indicating the vehicle speed. It should be noted that the vehicle speed sensor 15 is, strictly speaking, a wheel speed sensor arranged at each of four wheels of the vehicle SV. The VCECU is configured to acquire a speed of the vehicle SV (a vehicle speed) based on a wheel speed of each wheel detected by the vehicle speed sensor 15 (the wheel speed sensor).

A front camera 21*a*, a rear camera 21*b*, a right side camera 21*c*, and a left side camera 21*d* are connected to the PVM-ECU 20. Hereinafter, when there is no need to distinguish these cameras 21*a* to 21*d* from each other, they will be collectively referred to as a "camera 21". The camera 21 corresponds to one example of an "imaging apparatus".

As shown in FIG. 2, the front camera 21*a* is arranged at a substantially central part of a front bumper FB in a vehicle width direction.

The rear camera 21*b* is arranged on a wall part of a rear trunk RT positioned at a rear part of the vehicle SV. An optical axis of the rear camera 21*b* is oriented backward of the vehicle SV.

The right side camera 21*c* is arranged at a right-side door mirror DMR. An optical axis of the right side camera 21*c* is oriented to a right side of the vehicle SV.

The left side camera 21*d* is arranged at a left-side door mirror DML. An optical axis of the left side camera 21*d* is oriented to a left side of the vehicle SV.

An angle of view of the camera 21 is wide-angle. Therefore, an imaging range of the camera 21 includes "right-side, left-side, lower-side, and upper-side ranges" of each of the optical axes. A whole surrounding of the vehicle SV is included in imaging ranges of four cameras 21*a* to 21*d*.

The camera 21 takes an image of a surrounding region of the vehicle SV corresponding to the imaging range and acquires image information (image data) every time a predetermined time elapses. The camera 21 transmits the acquired image data to the PVM-ECU 20 and the VCECU.

More specifically, the front camera 21*a* takes an image of a "front surrounding region of the vehicle SV" corresponding to the imaging range thereof. The front camera 21*a* transmits to the PVM-ECU 20 the acquired image data (hereinafter, referred to as a "front image data").

The rear camera 21*b* takes an image of a "rear surrounding region of the vehicle SV" corresponding to the imaging range thereof. The rear camera 21*b* transmits to the PVM-ECU 20 the acquired image data (hereinafter, referred to as a "rear image data").

The right side camera 21*c* takes an image of a "right-side surrounding region of the vehicle SV" corresponding to the imaging range thereof. The right side camera 21*c* transmits to the PVM-ECU 20 the acquired image data (hereinafter, referred to as a "right-side image data").

The left side camera 21*d* takes an image of a "left-side surrounding region of the vehicle SV" corresponding to the imaging range thereof. The left side camera 21*d* transmits to the PVM-ECU 20 the acquired image data (hereinafter, referred to as a "left-side image data").

The PVM-ECU 20 generates surrounding image data using the front image data, the rear image data, the right-side image data, and the left-side image data every time the predetermined time elapses. An image displayed (generated) based on the surrounding image data is referred to as a surrounding image. The surrounding image is an image corresponding to at least a part of the range of the surrounding region of the vehicle SV. The surrounding image includes a camera's viewpoint image, a composite image, and the like.

The camera's viewpoint image is an image where a viewpoint is set at a position at which each lens of the camera 21 is arranged.

The composite image is, for example, an image of the surrounding of the vehicle SV seen from a virtual viewpoint set at an arbitrary position around the vehicle SV. Hereinafter, this image will be referred to as a "virtual viewpoint image".

A method for generating this virtual viewpoint image is well-known (for example, refer to Japanese Patent Applications Laid-Open No. 2012-217000, 2016-192772, 2018-107754 and the like). It should be noted that the PVM-ECU 20 may generate an image where a vehicle image (a polygon showing a vehicle shape, for instance), lines for supporting parking operation, and the like are further combined with (superimposed on) each of the camera's viewpoint image and the virtual viewpoint image. Such an image is also referred to as a surrounding image.

A brief description on a summary of a method for generating a virtual viewpoint image data used as a basis of the virtual viewpoint image will be made. The PVM-ECU 20 projects pixels included in the front image data, the rear image data, the right-side image data, and the left-side image data on a predetermined projection curved surface (a semi-spherical surface, for example) in a virtual three-dimensional space.

A center of the projection curved surface is regulated as a position of the vehicle SV. Parts other than the center of the projection curved surface correspond to the front image data, the rear image data, the right-side image data, and the left-side image data. The PVM-ECU 20 projects information of the pixels included in these image data on the parts other than the center of the projection curved surface.

The PVM-ECU 20 disposes a polygon having a shape of the vehicle SV at the center of the projection curved surface. Thereafter, the PVM-ECU 20 sets a virtual viewpoint in the virtual three-dimensional space, and cuts out, as image data, a predetermined region out of the projection curved surface included within a predetermined viewing angle when seen from this virtual viewpoint. Further, the PVM-ECU 20 superimposes on this cut out image data the polygon of the vehicle SV included in this predetermined viewing angle. Accordingly, the virtual viewpoint image data is generated.

The PVM-ECU 20 generates, using the front image data, the rear image data, the right-side image data, and the left-side image data, a front bird's-eye view image data, a rear bird's-eye view image data, a right bird's-eye view image data, and a left bird's-eye view image data, respectively, every time a predetermined time elapses.

The front bird's-eye view image data is an image data acquired by converting the front image data to an image where the front image data is seen from a bird's-eye view direction (a vertically downward direction with respect to a surface on which the vehicle SV is grounded).

The rear bird's-eye view image data is an image data acquired by converting the rear image data to an image where the rear image data is seen from the bird's-eye view direction.

The right bird's-eye view image data is an image data acquired by converting the right-side image data to an image where the right-side image data is seen from the bird's-eye view direction.

The left bird's-eye view image data is an image data acquired by converting the left-side image data to an image where the left-side image data is seen from the bird's-eye view direction.

Images generated based on the front bird's-eye view image data, the rear bird's-eye view image data, the right bird's-eye view image data, and the left bird's-eye view image data will be referred to as a front bird's-eye view image, a rear bird's-eye view image, a right bird's-eye view image, and a left bird's-eye view image, respectively. Hereinafter, these bird's-eye view images may be collectively referred to as "bird's-eye view images".

Figure 3:
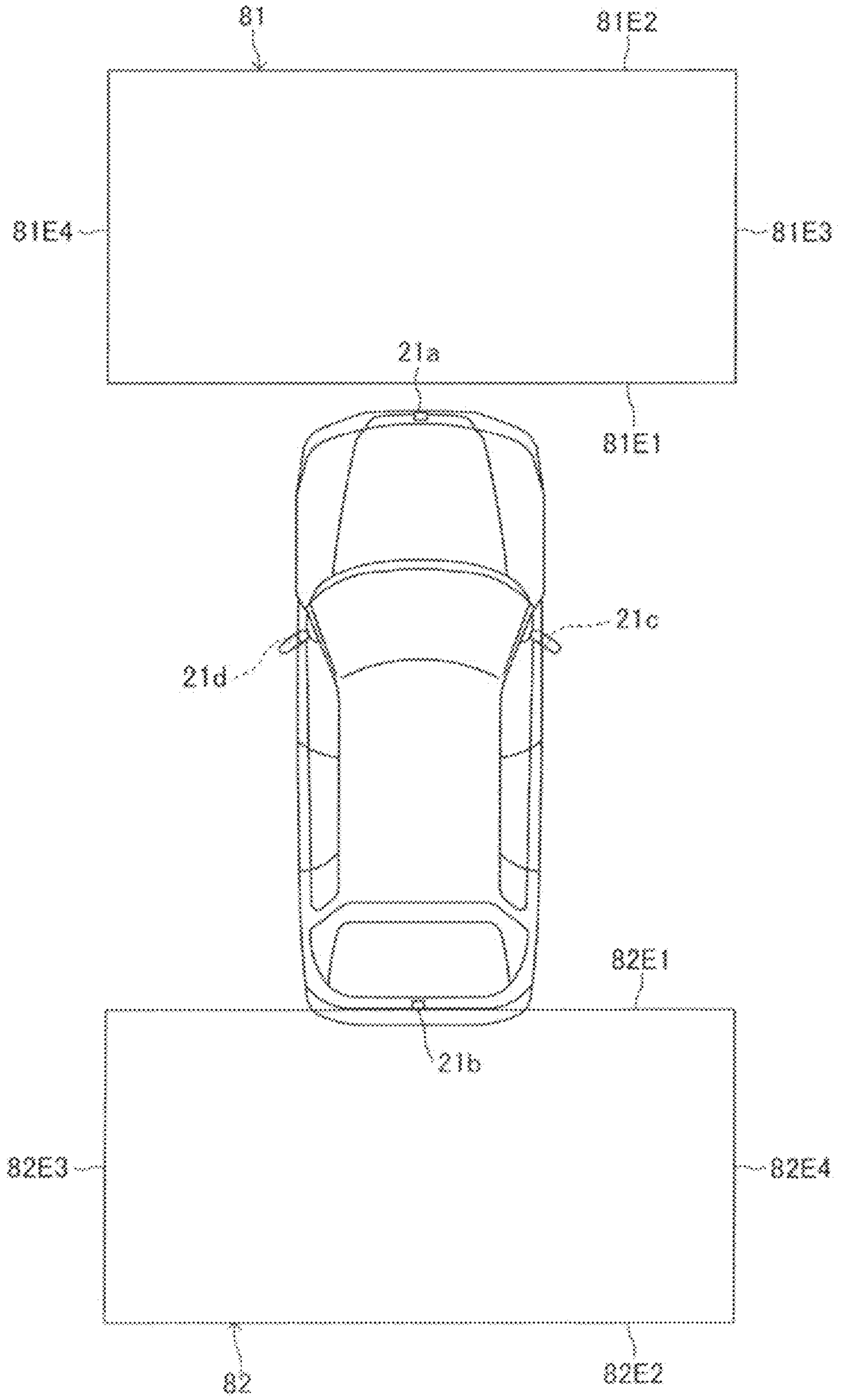
FIG. 3 is a schematic diagram showing capturing areas on a ground, each being included in a front bird's-eye view image and a rear bird's-eye view image.
Figure 4:
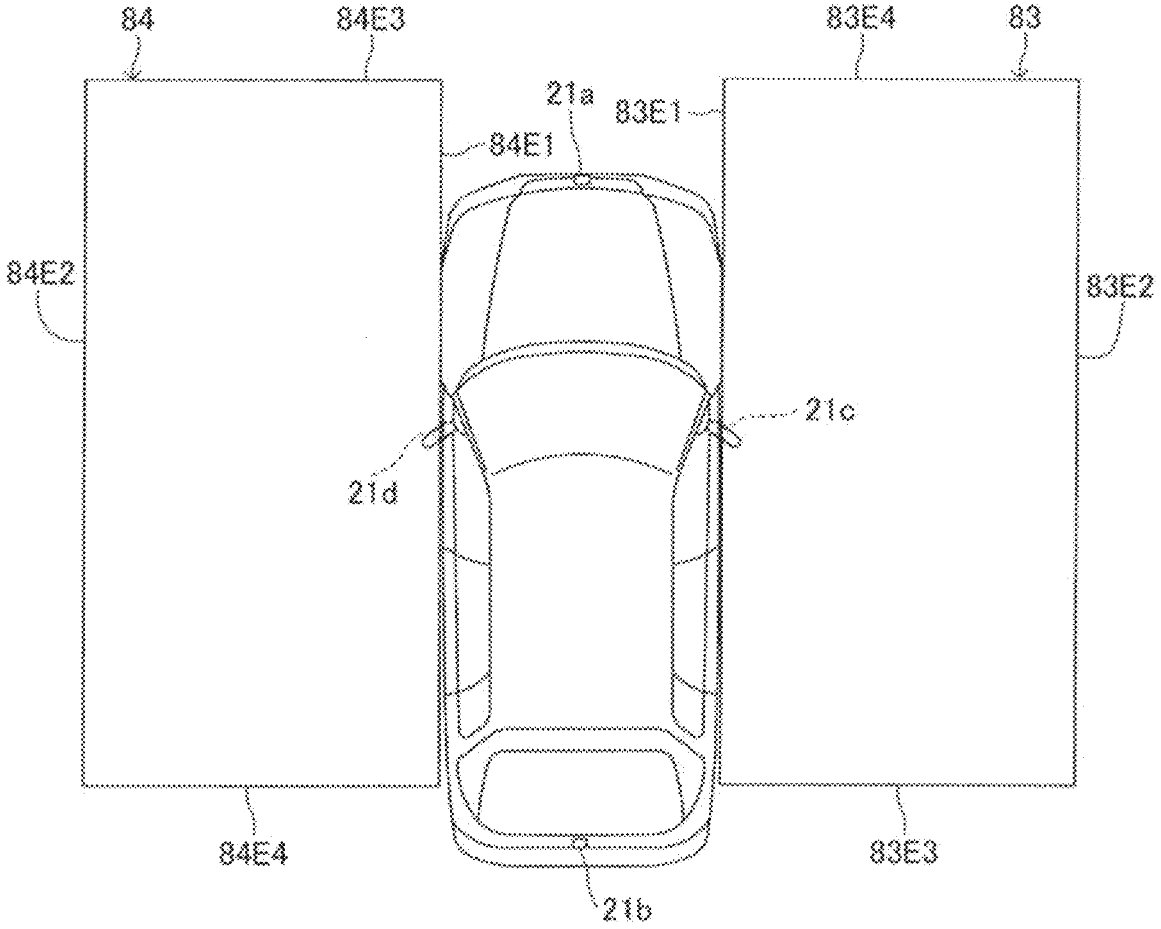
FIG. 4 is a schematic diagram showing capturing areas on a ground, each being included in a right bird's-eye view image and a left bird's-eye view image.

As shown in FIG. 3 and FIG. 4, a capturing area 81 on the ground included in the front bird's-eye view image, a capturing area 82 on the ground included in the rear bird's-eye view image, a capturing area 83 on the ground included in the right bird's-eye view image, and a capturing area 84 on the ground included in the left bird's-eye view image are all rectangular shaped and have same sizes with each other.

As shown in FIG. 3, an edge 81E1, an edge 81E2, and an edge 82E1, an edge 82E2, each extending in a longer direction of the capturing area 81 and the capturing area 82 are all parallel to a vehicle width direction of the vehicle SV. An edge 81E3, an edge 81E4, and an edge 82E3, an edge 82E4 each extending in a shorter direction of the capturing areas 81 and 82 are all parallel to a front-rear direction of the vehicle SV. The capturing area 81 is defined in such a manner that the front camera 21*a* is positioned at a substantially central position of the edge 81E1 when seen from the bird's-eye view direction. The capturing area 82 is defined in such a manner that the rear camera 21*b* is positioned at a substantially central position of the edge 82E1 when seen from the bird's-eye view direction. With this, a relative position on the ground of each of the capturing area 81 and the capturing area 82 with respect to the vehicle SV is uniquely determined.

As shown in FIG. 4, an edge 83E1, an edge 83E2, and an edge 84E1, an edge 84E2, each extending in a longer direction of the capturing area 83 and the capturing area 84 are all parallel to the front-rear direction of the vehicle SV. An edge 83E3, an edge 83E4, and an edge 84E3, an edge 84E4 each extending in a shorter direction of the capturing areas 83 and 84 are all parallel to the vehicle width direction of the vehicle SV. The capturing area 83 is defined in such a manner that the right side camera 21*c* is positioned at a substantially central position of the edge 83E1 when seen from the bird's-eye view direction. The capturing area 84 is defined in such a manner that the left side camera 21*d* is positioned at a substantially central position of the edge 84E1 when seen from the bird's-eye view direction. With this, a relative position on the ground of each of the capturing area 83 and the capturing area 84 with respect to the vehicle SV is uniquely determined.

The VCECU is configured to acquire the bird's-eye view images from the PVM-ECU 20 every time the predetermined time elapses and be able to conduct image analysis of the bird's-eye view images at a predetermined timing (mentioned later) so as to extract feature points F. When extracting the feature points F, the VCECU divides each of the capturing areas 81 to 84 of the bird's-eye view images into several divided regions, and extract a fixed number (mentioned later) of the feature points F, the number being set for every divided region in advance. A method for extracting the feature points F will be described below, referring to FIG. 5A to FIG. 7.

In the present embodiment, as shown in FIG. 5A to FIG. 5D, each of the capturing areas 81 to 84 is divided into 8 congruent divided regions by being divided into 4 equal regions in the longer direction thereof as well as into 2 equal regions in the shorter direction thereof.

Figure 5A:
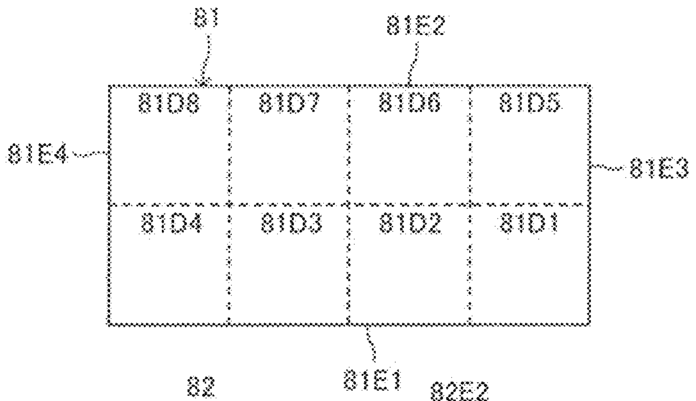
FIG. 5A is a diagram showing divided regions dividing the capturing area of the front bird's-eye view image.

As shown in FIG. 5A, the capturing area 81 is divided into a divided region 81D1 to a divided region 81D8.

Figure 5B:
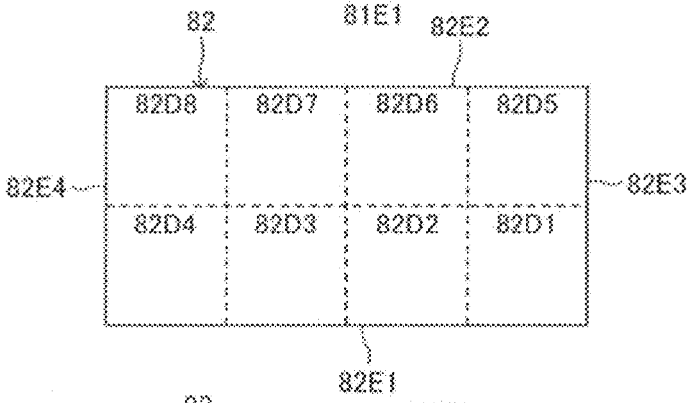
FIG. 5B is a diagram showing divided regions dividing the capturing area of the rear bird's-eye view image.

As shown in FIG. 5B, the capturing area 82 is divided into a divided region 82D1 to a divided region 82D8.

Figure 5C:
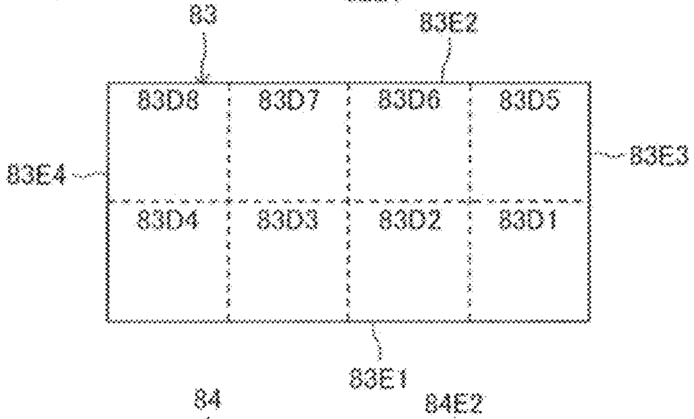
FIG. 5C is a diagram showing divided regions dividing the capturing area of the right bird's-eye view image.

As shown in FIG. 5C, the capturing area 83 is divided into a divided region 83D1 to a divided region 83D8.

Figure 5D:
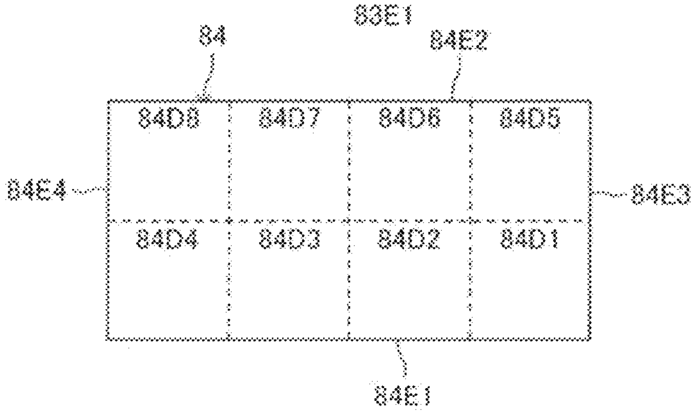
FIG. 5D is a diagram showing divided regions dividing the capturing area of the left bird's-eye view image.

As shown in FIG. 5D, the capturing area 84 is divided into a divided region 84D1 to a divided region 84D8.

Figure 6:
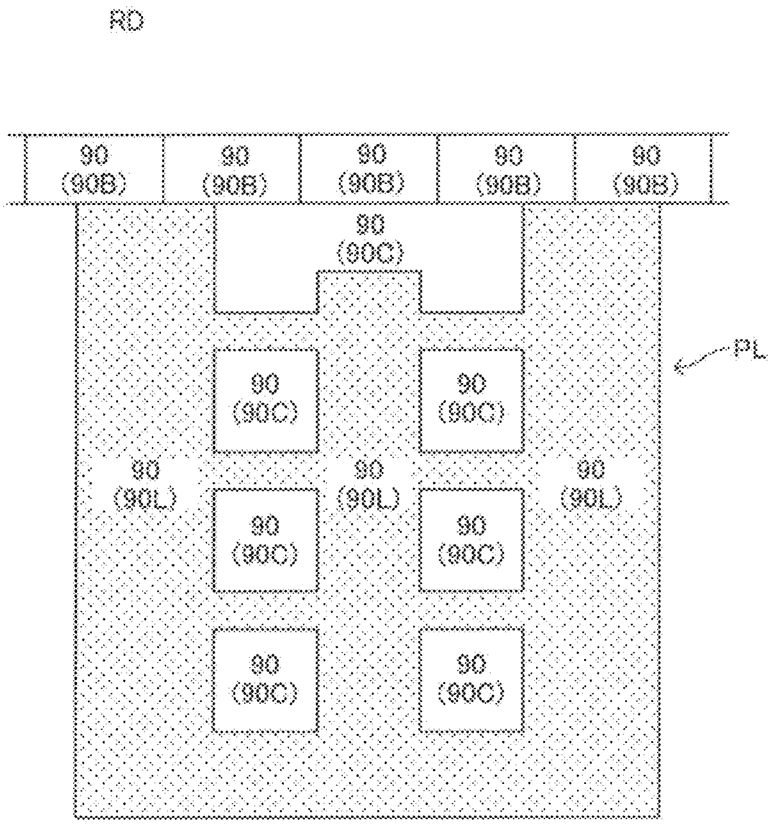
FIG. 6 is a diagram showing a parking lot of a personal residence and a peripheral area thereof when seen from a bird's-eye view direction.

FIG. 6 is a diagram showing a parking lot PL of a personal residence and a peripheral area thereof when seen from the bird's-eye view direction. A ground 90 of the parking lot PL is composed of concrete 90C and lawn 90L. Between the parking lot PL and a road RD, several concrete blocks 90B for covering a street drain are placed side by side. That is, the ground 90 near the parking lot PL is composed of the blocks 90B.

Figure 7:
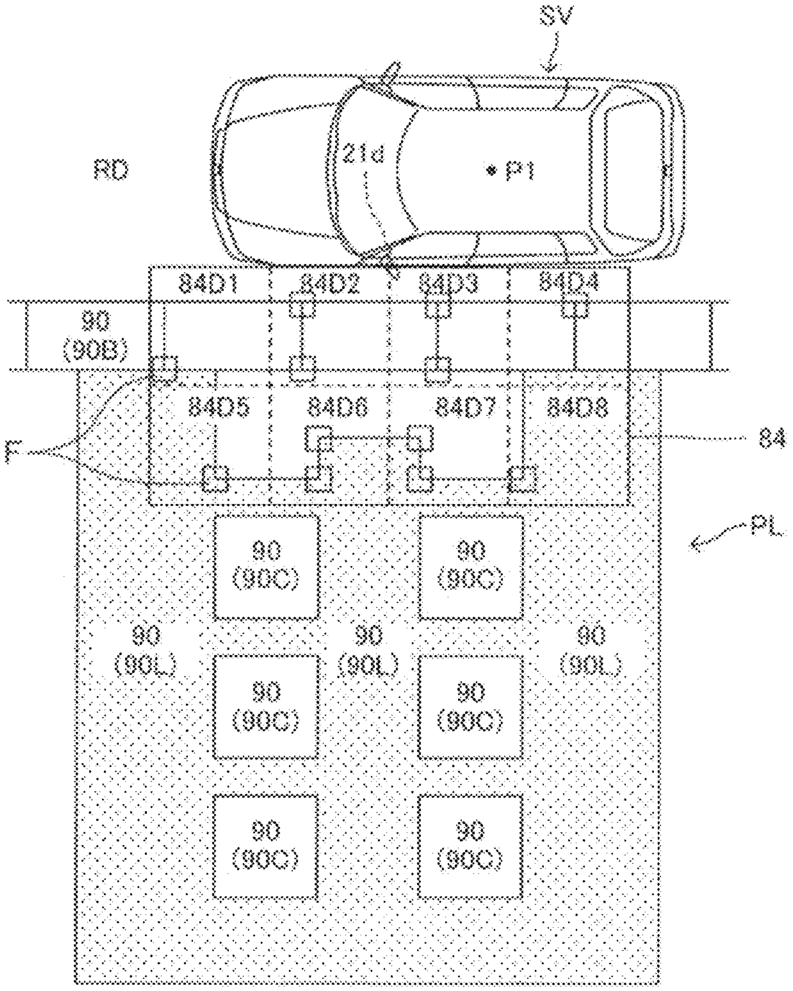
FIG. 7 is a diagram showing feature points included in the capturing area of the left bird's-eye view image generated from a left-side image data acquired by taking an image of the parking lot in FIG. 6 and the peripheral area thereof.

FIG. 7 is a diagram showing the feature points F included in the capturing area 84 of the left bird's-eye view image generated from the left-side image data acquired by taking an image of the parking lot PL and the peripheral area thereof. Each of the feature points F is a square shaped image including a part (especially, a corner part and a curved part) where a change in luminance is relatively large. A pair of facing edges of each of the feature points F are parallel to the longer direction of each bird's-eye view image, and another pair of facing edges of each of the feature points F is parallel to the shorter direction of each bird's-eye view image. In the present embodiment, a length of each edge of each of the feature points F is set to 20 pixels.

As shown in FIG. 7, the capturing area 84 includes the concrete 90C, the lawn 90L, and the blocks 90B, and a change in the luminance is relatively large at boundaries therebetween. Therefore, when extracting the feature points F from this left bird's-eye view image, the VCECU divides the capturing area 84 into 8 divided regions 84D1 to 84D8, and extracts, from each divided region, boundaries (especially, corner parts) between the concrete 90C and the lawn 90L as well as boundaries (especially, corner parts) between the block 90B and the block 90B as the feature points F. In an example of FIG. 7, the VCECU extracts two feature points F from each of the divided regions 84D2, 84D3, 84D6, and 84D7 and extracts one feature point F from each of the divided regions 84D1, 84D4, 84D5, and 84D8. When extracting the feature points F from other bird's-eye view images, a similar method can be used.

It should be noted that the VCECU executes processing of conducting image analysis of the bird's-eye view images and masking a three-dimensional object included in the bird's-eye view images before executing the processing of extracting the feature points F from the bird's-eye view images. The VCECU is configured not to extract the feature points F from a masked part. Thereby, the feature points F are extracted as images of the ground 90.

A touch panel display 22 is further connected to the PVM-ECU 20. The touch panel display 22 is a touch-panel type display which a non-illustrated navigation apparatus comprises. The PVM-ECU 20 displays the surrounding image on the touch panel display 22 in response to an instruction transmitted from the VCECU.

The VCECU is configured to be capable of performing parking assist control. The parking assist control includes following two types of assist modes, that is, a registration mode and a parking assist mode. When the VCECU performs (executes) the parking assist control, the PVM-ECU 20 displays a parking assist image (an operation image) including the surrounding image on the touch panel display 22 in response to an instruction transmitted from the VCECU.

The engine ECU 30 is connected to an engine actuator 31. The engine actuator 31 includes a throttle valve actuator for changing an opening degree of the throttle valve of an engine (a spark ignition type or a fuel injection type of internal combustion engine) 32. The engine ECU 30 drives the engine actuator 31 and thereby can change torque generated by the engine 32. The torque generated by the engine 32 is transmitted to driving wheels via a non-illustrated transmission.

Therefore, the engine ECU 30 controls the engine actuator 31 and thereby can control driving force of the vehicle SV. The VCECU can transmit a driving instruction to the engine ECU 30. When having received the driving instruction, the engine ECU 30 controls the engine actuator 31 in response to this driving instruction. Thus, the VCECU can perform "driving force automatic control" (mentioned later) via the engine ECU 30. It should be noted that when the vehicle SV is a hybrid vehicle, the engine ECU 30 can control driving force of the vehicle SV generated by either one or both of "an engine and a motor" which are serving as a vehicle driving source. Further, when the vehicle SV is an electric vehicle, the engine ECU 30 can control driving force of the vehicle SV generated by a motor which is serving as a vehicle driving source.

The brake ECU 40 is connected to a brake actuator 41. The brake actuator 41 is provided in a hydraulic circuit between a non-illustrated master cylinder to compress operating fluid with a pedaling force of the brake pedal and friction brake mechanisms 42 provided at each wheel. Each of the friction brake mechanisms 42 comprises a brake disc 42*a* fixed to the wheel and a brake caliper 42*b* fixed to a vehicle body.

The brake actuator 41 adjusts, in response to an instruction from the brake ECU 40, a hydraulic pressure that is supplied to a wheel cylinder which is built in the brake caliper 42*b*, and operates the wheel cylinder with the hydraulic pressure. Thereby, the brake actuator 41 presses a brake pad onto the brake disc 42*a* to generate friction braking force. Accordingly, the brake ECU 40 controls the brake actuator 41 and thereby can control the braking force of the vehicle SV. The VCECU can transmit a braking instruction to the brake ECU 40. When having received the braking instruction, the brake ECU 40 controls the brake actuator 41 in response to this braking instruction. Thus, the VCECU can perform "braking force automatic control" (mentioned later) via the brake ECU 40.

The EPS•ECU 50 is a control apparatus of a well-known electrically-driven power steering system and is connected to a motor driver 51. The motor driver 51 is connected to a steered motor 52. The steered motor 52 is incorporated into "steering mechanism including a steering wheel SW, a steering shaft SF, a non-illustrated steering gear mechanism, and the like". The steered motor 52 generates torque with electric power supplied from the motor driver 51 and with the torque, can generate steering assist torque or can turn left-and-right steered wheels. That is, the steered motor 52 can change a steered angle of the vehicle SV.

Further, the EPS•ECU 50 is connected to a steering angle sensor 53 and a steering torque sensor 54. The steering angle sensor 53 is configured to detect a steering angle of the steering wheel SW of the vehicle SV and output a signal indicating the detected steering angle. The steering torque sensor 54 is configured to detect steering torque generated at the steering shaft SF of the vehicle SV by the steering wheel SW being operated and to output a signal indicating the detected steering torque.

EPS•ECU 50 detects, using the steering torque sensor 54, the steering torque which the driver inputs to the steering wheel SW, and drives the steered motor 52 based on this steering torque. The EPS•ECU 50 thereby applies steering torque (steering assist torque) to the steering mechanism, which makes it possible to assist steering operation by the driver.

The VCECU can transmit a steering instruction to the EPS•ECU 50. When having received the steering instruction, the EPS•ECU 50 controls the steered motor 52 based on this steering instruction received. Accordingly, the VCECU can automatically change the steered angle of the steered wheels of the vehicle SV via the EPS•ECU 50 (that is, without the steering operation by the driver). Namely, the VCECU can perform "steered angle automatic control" (mentioned later) via the EPS•ECU 50.

The meter ECU 60 is connected to an indicator 61. The indicator 61 is a multi-information display provided in front of a driver's seat. The indicator 61 displays measured values such as the vehicle speed, engine rotational speed, and the like as well as various types of information.

The SBW•ECU 70 is connected to a shift position sensor 71. The shift position sensor 71 detects a position of a shift lever 72 serving as a movable part of a shift operation part. In the present embodiment, positions of the shift lever 72 include a parking position (P), a moving forward position (D), and a moving backward position (R). The SBW•ECU 70 is configured to receive a position of the shift lever 72 from the shift position sensor 71 and control, based on the position received, a non-illustrated transmission and/or a driving direction shifting mechanism of the vehicle SV (that is, perform shift control of the vehicle SV).

More specifically, when the shift lever 72 is positioned at "P", the SBW•ECU 70 controls the transmission and/or the driving direction shifting mechanism in such a manner that no driving force is transmitted to driving wheels and the vehicle SV is mechanically locked at a stop position. When the shift lever 72 is positioned at "D", the SBW•ECU 70 controls the transmission and/or the driving direction shifting mechanism in such a manner that driving force for moving the vehicle SV forward is transmitted to the driving wheels. Further, when the shift lever 72 is positioned at "R", the SBW•ECU 70 controls the transmission and/or the driving direction shifting mechanism in such a manner that driving force for moving the vehicle SV backward is transmitted to the driving wheels.

The VCECU can transmit a shifting instruction to the SBW•ECU 70. When having received the shifting instruction, the SBW•ECU 70 can, in response to this shifting instruction, control the transmission and/or the driving direction shifting mechanism without relying on the operation of the shift lever 72 by the driver and thereby can shift a position of the shift lever 72. This control of the transmission and/or the driving direction shifting mechanism based on the shifting instruction transmitted from the VCECU will be referred to as "shift position automatic control".

As stated above, the parking assist control includes two types of assist modes, that is, the registration mode and the parking assist mode. The registration mode is a mode where the driver of the vehicle SV can register a "position in which the driver is planning to park the vehicle SV (i.e., a planned parking position)" in the VCECU as a registered parking position in advance. On the other hand, the parking assist mode includes following two types of assist modes, that is, a first parking mode and a second parking mode. The first parking mode is a mode where control for automatically parking the vehicle SV in the registered parking position or control for assisting in parking the vehicle SV in the registered parking position is performed. The second parking mode is a well-known mode where a parking position is calculated based on the image information (white lines defining a parking space, for example) acquired from the camera 21, the object information (a wall of a building and a fence, for example) acquired by the radar sensor 11, and/or the information on the distance to a three-dimensional object acquired from the ultrasonic sensor, and thereafter control for automatically parking the vehicle SV in this parking position or control for assisting in parking the vehicle SV in this parking position is performed. In the present embodiment, a description on the registration mode and the first parking mode of the parking assist mode will be made. Hereinafter, the parking assist mode means the first parking mode unless otherwise stated.

As is obvious from the description above, in this specification, the parking assist control includes both of the "control for automatically parking the vehicle in the parking position" and the "control for assisting in parking the vehicle in the parking position". The former control is performed by the VCECU performing following controls; the driving force automatic control, the braking force automatic control, the steered angle automatic control, and shift position automatic control. The latter control is performed by the VCECU performing at least one of the aforementioned four types of automatic controls and having the driver perform the rest of driving operation (for example, the operation of the shift lever 72). The present embodiment assumes a case where the VCECU performs (executes) the former control.

At the registration mode, it is configured that a position where backward perpendicular parking and/or backward parallel parking are/is possible can be registered as a parking position. In the present embodiment, the perpendicular parking is defined as a parking type in which the front-rear direction of the vehicle SV at a start timing of the parking assist control crosses the front-rear direction of the vehicle SV at a timing when the vehicle SV has been parked in the registered parking position. The parallel parking is defined as a parking type in which the front-rear direction of the vehicle SV at the start timing of the parking assist control is substantially parallel to the front-rear direction of the vehicle SV at a timing when the vehicle SV has been parked in the registered parking position.

<Operation>

(Registration Mode)

Figure 8:
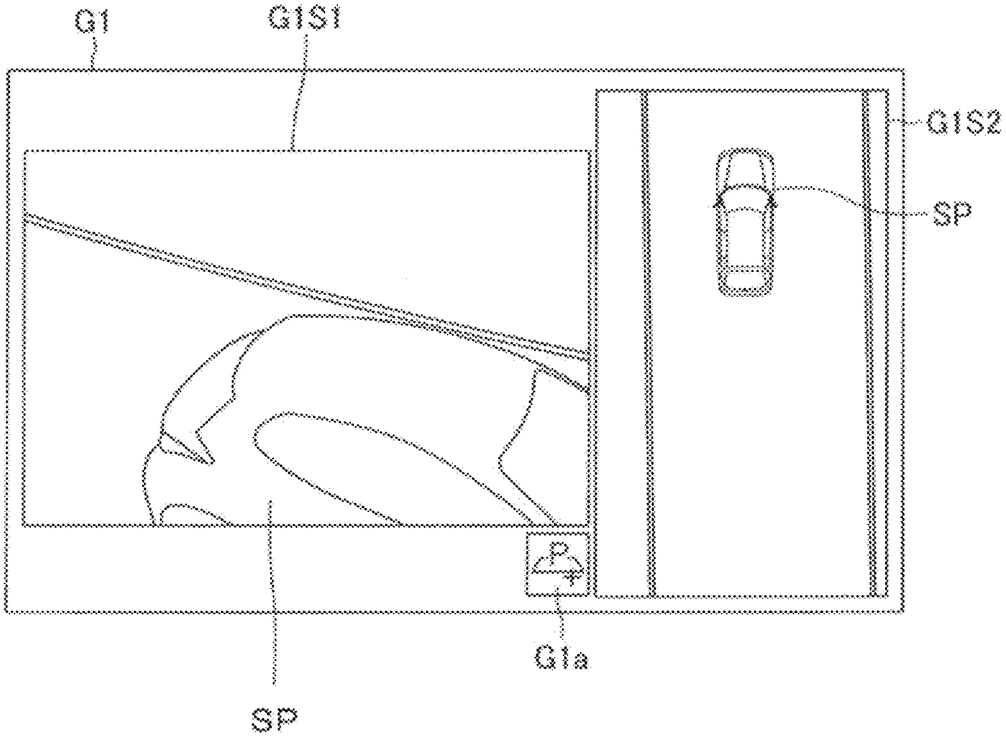
FIG. 8 is a diagram for describing operation of the parking assist apparatus at registration mode and a display image of a display.

When the driver operates the parking assist switch 14 under a state where the vehicle SV is stopped, a system (hereinafter, referred to as a "parking assist system") constructed for performing the parking assist control is activated. In a case where the parking assist system is activated when a parking position has not been registered yet, the VCECU first determines whether or not the second parking mode of the parking assist mode is feasible based on the image information, the object information, the information on the distance to a three-dimensional object, and so on. When it is determined that the second parking mode is feasible, the VCECU displays on the touch panel display 22 a display image G1 illustrated in FIG. 8. The display image G1 is divided into a left side region and a right side region.

The left side region of the display image G1 includes a composite image G1S1 and a registration start button G1*a*. The composite image G1S1 is a surrounding image where a polygon SP corresponding to the vehicle SV is superimposed on a virtual viewpoint image where a "region in which parking by the second parking mode is possible" is seen from a virtual viewpoint set above the vehicle SV. The registration start button G1*a* is a button touched by the driver for a purpose of initiating processing of registering a parking position in the VCECU.

The right side region of the display image G1 includes a composite image G1 S2. The composite image G1 S2 is a surrounding image where the polygon SP is superimposed on a virtual viewpoint image where a surrounding of the vehicle SV is seen from a virtual viewpoint set right above the vehicle SV. Hereinafter, a composite image where a virtual viewpoint is set right above the vehicle SV will be especially referred to as a "composite bird's-eye view image".

When a parking start button (illustration omitted) included in the display image G1 is touched, the parking assist control at the second parking mode is started.

It should be noted that in the display image G1, various types of messages, buttons, and marks for starting the second parking mode are actually included. However, illustration and description thereof will be omitted for convenience sake. Same thing can be said for other images such as a display image G2 and a display image G3 described later.

On the other hand, when it is determined that the second parking mode is not feasible, the VCECU displays on the touch panel display 22 a message that the second parking mode is not feasible as well as the registration start button G1*a* (illustration omitted). That is, in a case where the parking assist system is activated when a parking position has not been registered yet, the registration start button G1*a* is displayed on the touch panel display 22 regardless of whether or not the second parking mode is feasible.

When the registration start button G1*a* is touched, the VCECU starts the execution of the registration mode, and determines whether or not a registration of a parking position is possible by means of the perpendicular parking and/or the parallel parking in a right side region of the vehicle SV as well as whether or not a registration of a parking position is possible by means of the perpendicular parking and/or the parallel parking in a left side region of the vehicle SV. Hereinafter, "right side/left side regions of the vehicle SV" will be also simply referred to as "right side/left side regions".

Specifically, the VCECU determines, based on the image information, the object information, and the information on the distance to a three-dimensional object, whether or not a space where the perpendicular parking and/or the parallel parking of the vehicle SV are/is possible is present in the right side region and the left side region of the vehicle SV as well as whether or not it is possible to set a target route for moving the vehicle SV to this space without being interfered with any obstacles. Hereinafter, this determination will be referred to as "parking determination".

In addition, the VCECU determines whether or not the predetermined number (for example, 12) of the feature points F are extractable (can be extracted) from each of the right bird's-eye view image and the left bird's-eye view image based on information acquired from the PVM-ECU 20. That is, at the registration mode, a parking position is registered in association with a position of each of the feature points F (described later in detail). Therefore, when the feature points F are not extractable, even though a space is present where the perpendicular parking and/or the parallel parking are/is possible as well as it is possible to set a target route, a parking position cannot be registered in this space. Hereinafter, this determination will be referred to as "feature point determination". Besides, "the predetermined number of the feature points F are extractable" will be also simply referred to as "the feature points F are extractable".

When a space is present in the right side region where the perpendicular parking and/or the parallel parking are/is possible as well as it is possible to set a target route in a case where the feature points F are extractable from the right bird's-eye view image, the VCECU determines that the registration of a parking position is possible in the right side region by means of the perpendicular parking and/or the parallel parking, respectively.

When a space is present in the left side region where the perpendicular parking and/or the parallel parking are/is possible as well as it is possible to set a target route in a case where the feature points F are extractable from the left bird's-eye view image, the VCECU determines that the registration of a parking position is possible in the left side region by means of the perpendicular parking and/or the parallel parking, respectively.

When the feature points F are not extractable from the right/left bird's-eye view images, the VCECU determines that the registration of a parking position is impossible regardless of a result of the parking determination.

When a space is not present in the right side/left side regions where the perpendicular parking and/or the parallel parking are/is possible, or when it is impossible to set a target route even though the space is present, the VCECU determines that the registration of a parking position is impossible regardless of a result of the feature point determination.

Figure 9:
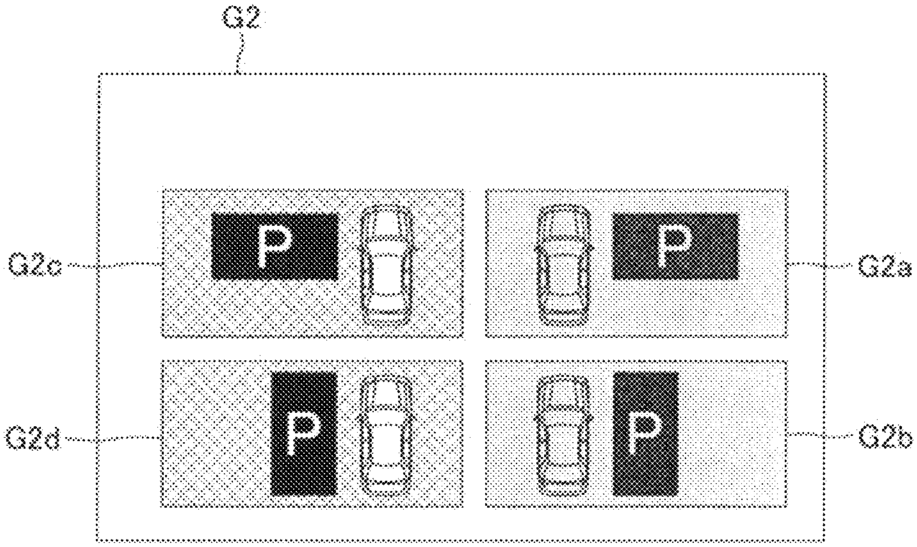
FIG. 9 is a diagram for describing the operation of the parking assist apparatus at the registration mode and a display image of the display.

When it is determined, by the parking determination and the feature point determination, that the registration of a parking position is possible by means of any one of the parking methods, the VCECU displays on the touch panel display 22 a display image G2 illustrated in FIG. 9. In addition, the VCECU stores in the RAM thereof, in association with the parking method, the right and/or left bird's-eye view image(s) in which the feature points F determined to be extractable by the feature point determination are included (described later). The display image G2 includes four parking method selection button, that is, a right perpendicular parking selection button G2*a*, a right parallel parking selection button G2*b*, a left perpendicular parking selection button G2*c*, and a left parallel parking selection button G2*d*.

When it is determined that the registration of a parking position is possible in the right side region by means of the perpendicular parking and/or the parallel parking, the VCECU displays the right perpendicular parking selection button G2*a* and/or the right parallel parking selection button G2*b* in a selectable manner, respectively. In addition, the VCECU stores in the RAM thereof the right bird's-eye view image in association with the perpendicular parking and/or the parallel parking into the right side region.

When it is determined that the registration of a parking position is possible in the left side region by means of the perpendicular parking and/or the parallel parking, the VCECU displays the left perpendicular parking selection button G2*c* and/or the left parallel parking selection button G2*b* in a selectable manner, respectively. In addition, the VCECU stores in the RAM thereof the left bird's-eye view image in association with the perpendicular parking and/or the parallel parking into the left side region.

In an example of FIG. 9, the button G2*c* and the button G2*d* are displayed in a selectable manner. Hereinafter, the display image G2 will be also referred to as a "parking method image G2".

For example, in an example of FIG. 7, when the registration mode is started by the registration start button G1*a* (refer to FIG. 8) being touched under a state where the vehicle SV is stopped in a predetermined position P1 on the road RD, and the VCECU has determined in the parking determination that the registration of a parking position is possible in the left side region by means of the perpendicular parking and the parallel parking as well as has determined in the feature point determination that the feature points F are extractable from the left bird's-eye view image (refer to the capturing area 84 in FIG. 7), the VCECU stores in the RAM thereof this left bird's-eye view image in association with the perpendicular parking into the left side region and the parallel parking into the left side region, respectively.

On the other hand, when the VCECU has determined in the parking determination and in the feature point determination that the registration of a parking position is impossible, the VCECU displays on the touch panel display 22 a message that the registration of a parking position is impossible (illustration omitted), and terminates the registration mode.

Figure 10:
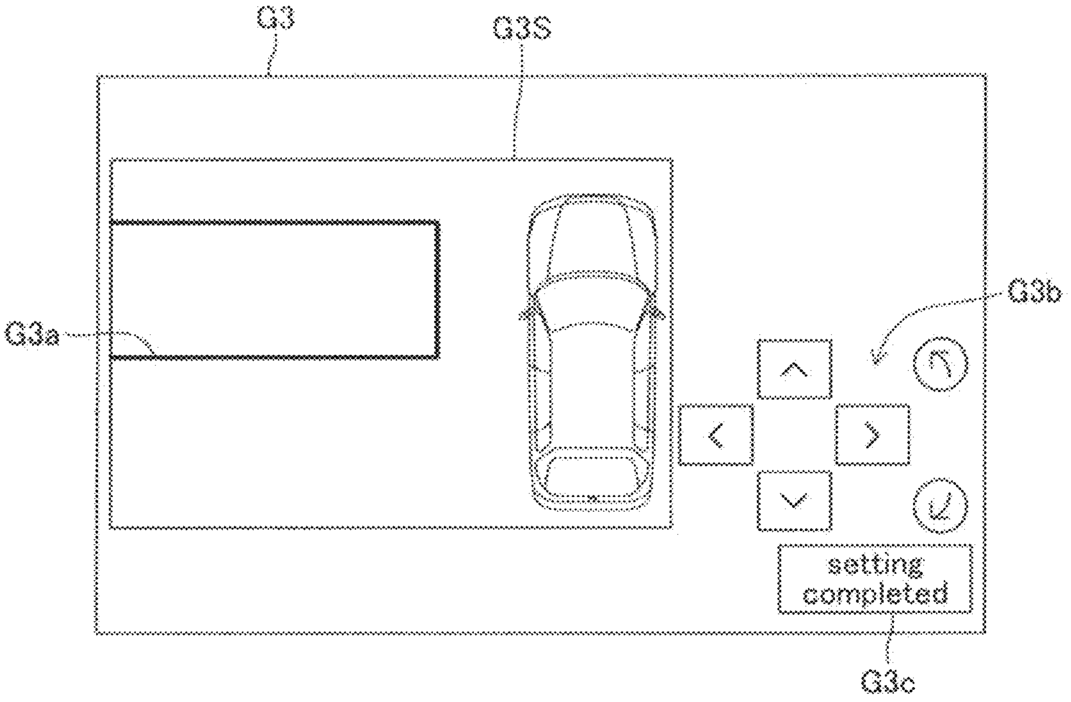
FIG. 10 is a diagram for describing the operation of the parking assist apparatus at the registration mode and a display image of the display.

When the driver touches either one of the parking method selection buttons corresponding to a desired parking method among the parking method selection buttons displayed in a selectable manner, the VCECU determines to execute the registration of a parking position by means of the selected parking method, and displays on the touch panel 22 a display image G3 illustrated in FIG. 10. In an example of FIG. 10, the display image G3 in a case of the left perpendicular parking selection button G2*c* being touched is displayed.

The display image G3 includes a composite image G3S in a left side region thereof. The composite image G3S is a composite bird's-eye view image. A parking position display frame G3*a* is displayed in a superimposed manner on the composite image G3S. The display image G2 includes a position operation button G3*b* and a setting completion button G3*c* in a right side region thereof. The position operation button G3*b* includes 6 arrow buttons of an upward arrow, a downward arrow, a leftward arrow, a rightward arrow, a clockwise directed arrow, and a counterclockwise directed arrow.

The parking position display frame G3*a* is a rectangular-shaped frame indicating a parking position where the registration is planned. The position operation button G3*b* is operated by the driver for a purpose of moving a position of the parking position display frame G3*a* in the composite image G3S.

When one of the upward arrow, the downward arrow, the leftward arrow, or the rightward arrow included in the position operation button G3*b* is touched once, the parking position display frame G3*a* moves toward a direction of the touched arrow by a predetermined distance in the composite image G3S. When one of the clockwise directed arrow or the counterclockwise directed arrow is touched once, the parking position display frame G3*a* rotates around a center thereof toward a rotational direction of the touched arrow by a predetermined angle in the composite image G3S. Thereby, the driver can move a position of the parking position display frame G3*a* to a desired position in the composite image G3S by operating the position operation button G3*b*. Hereinafter, this operation will be also referred to as "parking position setting operation".

The setting completion button G3*c* is a button used for temporarily determining a position indicated by the parking position display frame G3*a* as a parking position Ppark where the registration is planned, and touched for a purpose of starting the control for automatically parking the vehicle SV in the parking position Ppark (the parking assist control). Hereinafter, the display image G3 will be also referred to as a "parking position setting image G3".

Figure 11:
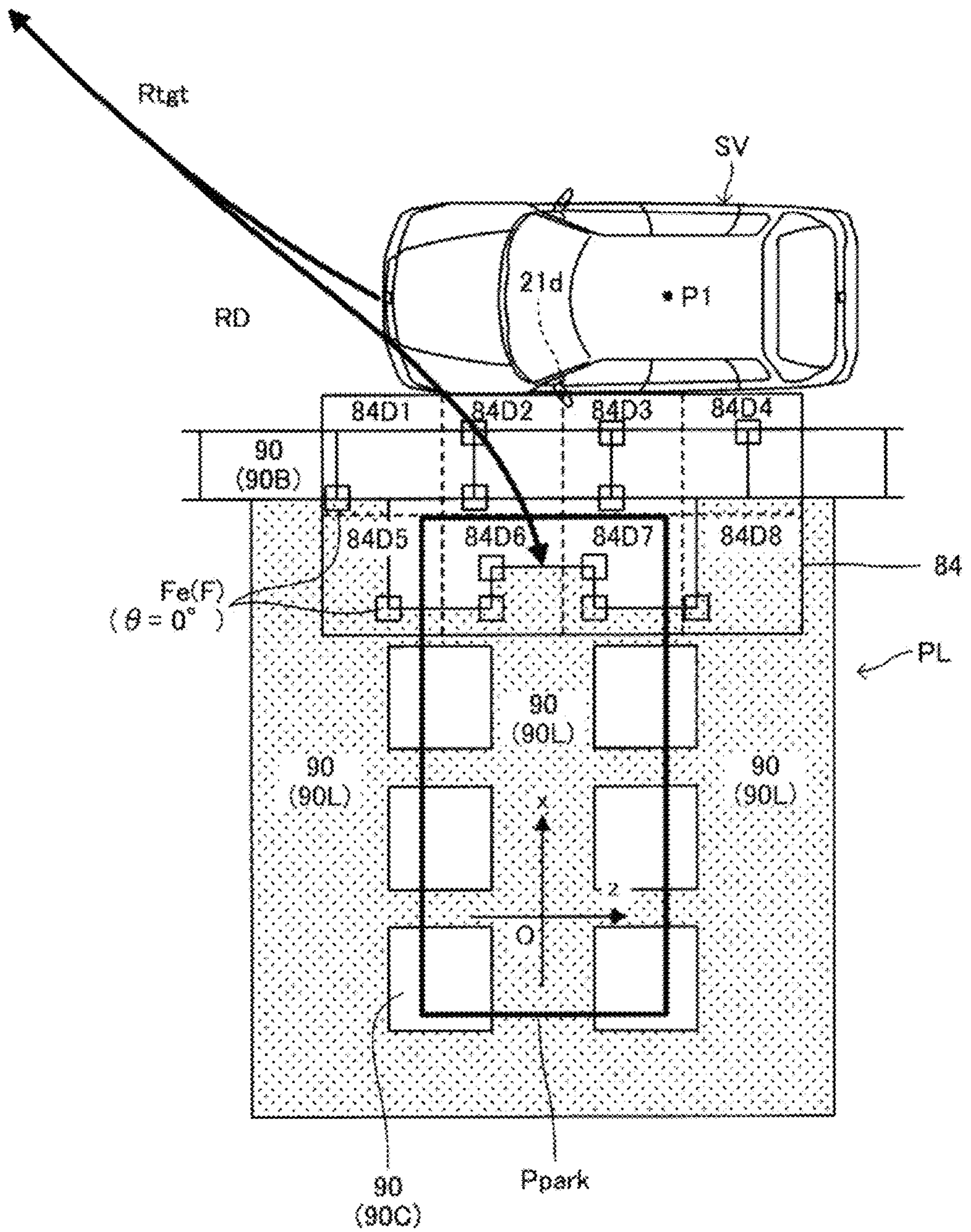
FIG. 11 is a diagram illustrating a positional relationship between a parking position temporarily set at the registration mode and the feature points, and a target route set based on this parking position.

FIG. 11 is a diagram showing the parking position Ppark in a case when the setting completion button G3*c* has been touched. When the setting completion button G3*c* has been touched, the VCECU, as shown in FIG. 11, set a coordinate system having an origin O at a predetermined position with respect to the parking position Ppark. Thereafter, the VCECU extracts each of the feature points F and stores gray level information, a coordinate (x, z), and an angle θ thereof in the RAM thereof (In other words, the VCECU registers each feature point F extracted in association with the parking position Ppark.). That is, as mentioned above, the VCECU stores in the RAM thereof the right bird's-eye view image and/or the left bird's-eye view image where the feature points F determined to be extractable by the feature point determination are included in association with the parking method. The VCECU reads out the bird's-eye view image(s) stored in the RAM and thereby stores in the RAM the gray level information, the coordinate (x, z), and the angle θ of each feature point F. It should be noted that strictly speaking, the right bird's-eye view image or the left bird's-eye view image which is not associated with the parking method into the parking position Ppark is erased at a timing when the setting completion button G3*c* has been touched.

Figure 12A:
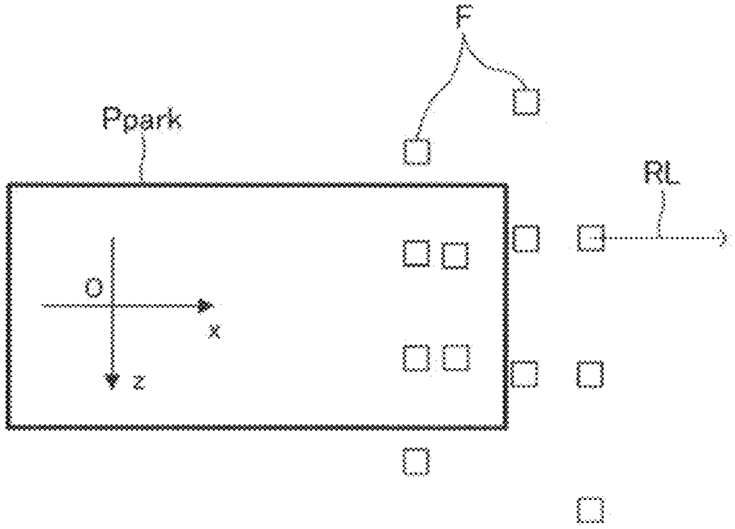
FIG. 12A is a diagram illustrating a positional relationship between the parking position and each feature point when a position operation toward rotational directions has not been conducted in the parking position setting operation.
Figure 12B:
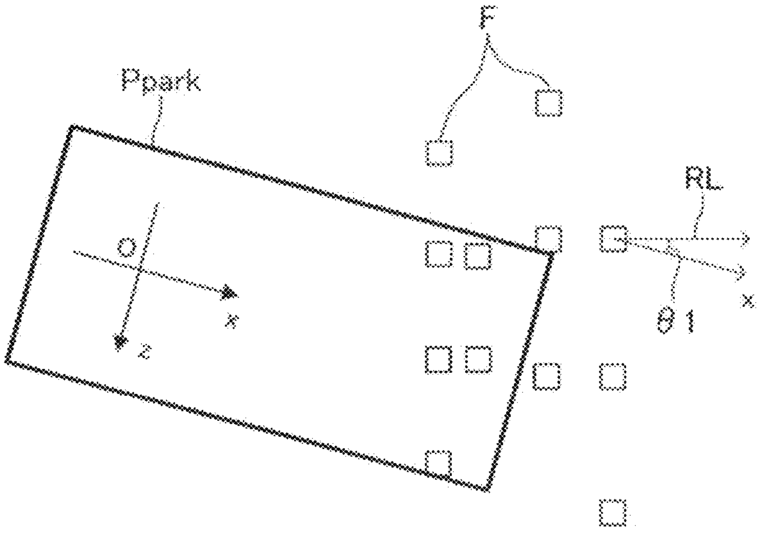
FIG. 12B is a diagram illustrating a positional relationship between the parking position and each feature point when the position operation toward the rotational directions has been conducted in the parking position setting operation.

As shown in FIG. 11, an x axis is set in such a manner that a positive direction thereof matches with a "forward direction in the front-rear direction of the vehicle SV when the vehicle SV moves backward (reverses) and is parked in the parking position Ppark (refer to FIG. 15)". As shown in FIG. 12A and FIG. 12B, an angle θ of each feature point F is defined as an angle formed by the x axis and a reference line RL set for each feature point F in advance. For example, the reference line RL is set in such a manner that a positive direction thereof matches with a "forward direction in the front-rear direction of the vehicle SV when assuming that the vehicle SV is parked in a parking position indicated by the parking position display frame G3*a* before the parking position setting operation is started". FIG. 12A is a diagram illustrating a positional relationship between the parking position Ppark and each feature point F when neither the clockwise directed arrow nor the counterclockwise directed arrow is operated in the parking position setting operation. FIG. 12B is a diagram illustrating a positional relationship between the parking position Ppark and each feature point F when the clockwise directed arrow is operated in the parking position setting operation and thereby the parking position Ppark is rotated by an angle 81. In FIG. 12A, an angle θ of each feature point F is 0° and in FIG. 12B, an angle θ of each feature point F is θ1. The present embodiment assumes that θ=0° for convenience sake.

As shown in FIG. 11, when the vehicle SV stops on the road RD near the parking lot PL, the feature points F are extracted as feature points of the ground 90 at an entrance of the parking lot PL. Therefore, hereinafter, the feature point F stored in the RAM of the VCECU at a timing when the setting completion button G3*c* has been touched will be referred to as an "entrance feature point Fe". With this, a positional relationship between the parking position Ppark and a group of the entrance feature points Fe is uniquely determined.

In addition, when the setting completion button G3*c* has been touched, the VCECU performs (executes) the control (the parking assist control) for automatically parking the vehicle SV into the parking position Ppark determined temporarily. This parking assist control is performed before the parking position Ppark (a parking position where the registration is planned) is actually registered, and therefore hereinafter, this control will be also referred to as "parking assist control for registration".

Specific description will be made on the parking assist control for registration. The VCECU determines, as a target route Rgt, a route for moving the vehicle SV from a current position (the position P1 in an example of FIG. 11) to the parking position Ppark without making the vehicle SV come into contact with any obstacles. That is, the VCECU identifies a positional relationship between a current position of the vehicle SV and the parking position Ppark, and calculates (sets) a target route Rgt along which the vehicle SV can move from the current position to the parking position Ppark. The VCECU determines "a direction to which the vehicle SV should be moved (specifically, a position of the shift lever 72), a steered angle pattern, and a speed pattern" for moving the vehicle SV along the target route Rgt. The VCECU performs the shift position automatic control for shifting a position (a state of the transmission and/or the driving direction shifting mechanism) of the shift lever 72 in response to a determined position of the shift lever 72, and thereafter performs the steered angle automatic control, the driving force automatic control, and the braking force automatic control in such a manner that the vehicle SV travels in accordance with the steered angle pattern and the speed pattern.

It should be noted that "the identification of the positional relationship between the current position of the vehicle SV and the parking position Ppark" described above is conducted by detecting the entrance feature points Fe. That is, when the parking assist control for registration is started, the VCECU determines, by a matching processing (described later), whether or not the entrance feature point(s) Fe is included in the bird's-eye view image acquired from the PVM-ECU 20 every time the predetermined time elapses. In a case when more than or equal to at least one entrance feature point Fe is included in the bird's-eye view image, the VCECU determines that the entrance feature point(s) Fe has been detected, and calculates the parking position Ppark based on the coordinate(s) (x, z) and the angle(s) e of the entrance feature point(s) Fe.

That is, the VCECU executes, while the parking assist control for registration is being performed, "processing for setting a target route Rgt based on the parking position Ppark calculated based on the entrance feature point(s) Fe, and performing the various types of controls for moving the vehicle SV along this target route Rgt" every time the predetermined time elapses. In the example of FIG. 11, it is considered that the entrance feature points Fe will be detected from the left bird's-eye view image for some time after the parking assist control for registration is started, and thereafter, will be detected from the rear bird's-eye view image.

It should be noted that there may also arise a case where the entrance feature point(s) Fe comes not to be detected from any bird's-eye view images as a result of the vehicle SV having moved along the target route Rgt. In this case, the VCECU makes use of the latest target route Rgt among a plurality of the target routes Rgt set in the past as a target route Rgt at the current timing.

Now, the matching processing will be described, referring to FIG. 13. The present embodiment apparatus executes the matching processing by means of template matching. The template matching is processing for searching for an image with a high similarity with a template image from an image with a predetermined area. The template matching is well-known, and thus a summary thereof will be briefly described below.

Figure 13:
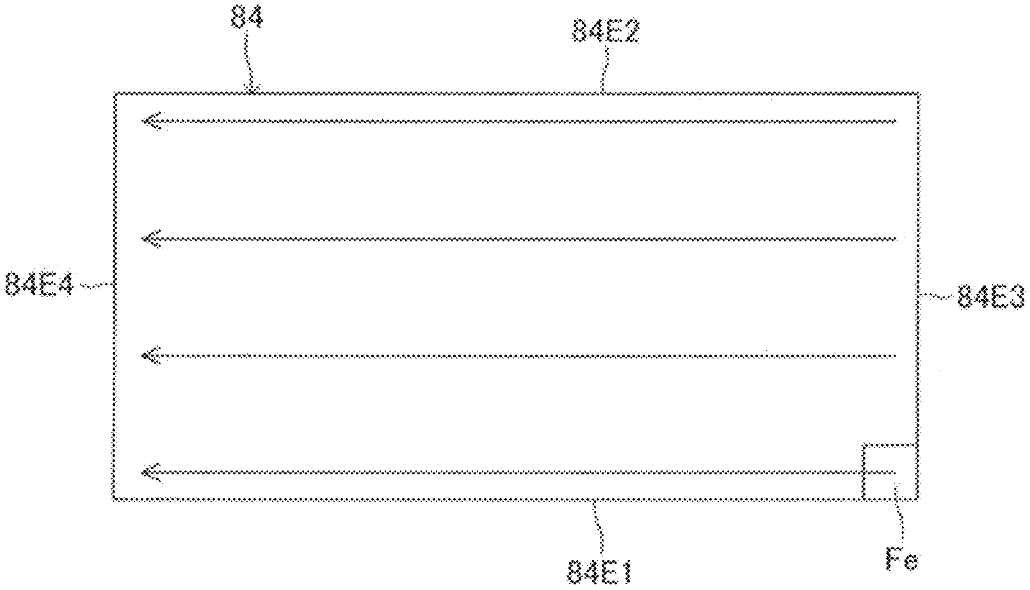
FIG. 13 is a diagram used to describe a template matching.

FIG. 13 is a diagram illustrating a case where the template matching is conducted within the capturing area 84 of the left bird's-eye view image, setting a certain arbitrary entrance feature point Fe as a template image. First, the VCECU calculates the gray level information of this entrance feature point Fe. Here, the gray level information of an image is information where a value (lumid–lumave) is associated with each of pixels constituting the image, the value being obtained by subtracting an average luminance value (lumave) of all the pixels from a luminance value (lumij where i, j are positional coordinates within the image) of each of the pixels. Subsequently, the VCECU cuts, from the left bird's-eye view image, an image having a same size and a same shape as the entrance feature point Fe, calculate the gray level information of this image, and calculate a similarity with the gray level information of the entrance feature point Fe. The VCECU executes this processing over a whole region within the capturing area 84.

Specifically, the VCECU executes the processing for calculating a similarity between the gray level information of the left bird's-eye view image and the gray level information of the entrance feature point Fe, shifting a pixel one by one in the longer direction of the capturing area 84. The VCECU repeats this processing, shifting a row one by one in the shorter direction of the capturing area 84. When an image having a similarity of the gray level information more than or equal to a predetermined similarity threshold is included in the left bird's-eye view image, the VCECU determines that the entrance feature point Fe has been detected from the left bird's-eye view image. The matching processing for other bird's-eye view images will be executed by a same method. Besides, when detecting other feature points F (an inside feature point(s) Fi and a peripheral feature point(s) Fp mentioned later) from the bird's-eye view images, a same matching processing will be executed.

Further, when the setting completion button G3*c* is touched and the parking assist control for registration is started, the VCECU displays on the touch panel display 22 a parking assist image for registration (illustration omitted). The parking assist image for registration includes in a left side region thereof a camera's viewpoint image where a region toward a moving direction is seen from a position of the vehicle SV, and includes in a right side region thereof a composite bird's-eye view image. When the camera's viewpoint image and the composite bird's-eye view image include the parking position Ppark, a parking position display frame indicating the parking position Ppark is displayed on these camera's viewpoint image and the composite bird's-eye view image in a superimposed manner.

At the registration mode, the inside feature points Fi and the peripheral feature points Fp are additionally extracted in addition to the entrance feature points Fe in order to improve calculation accuracy of the parking position Ppark based on the feature points F. First, the inside feature points Fi will be described.

Figure 14:
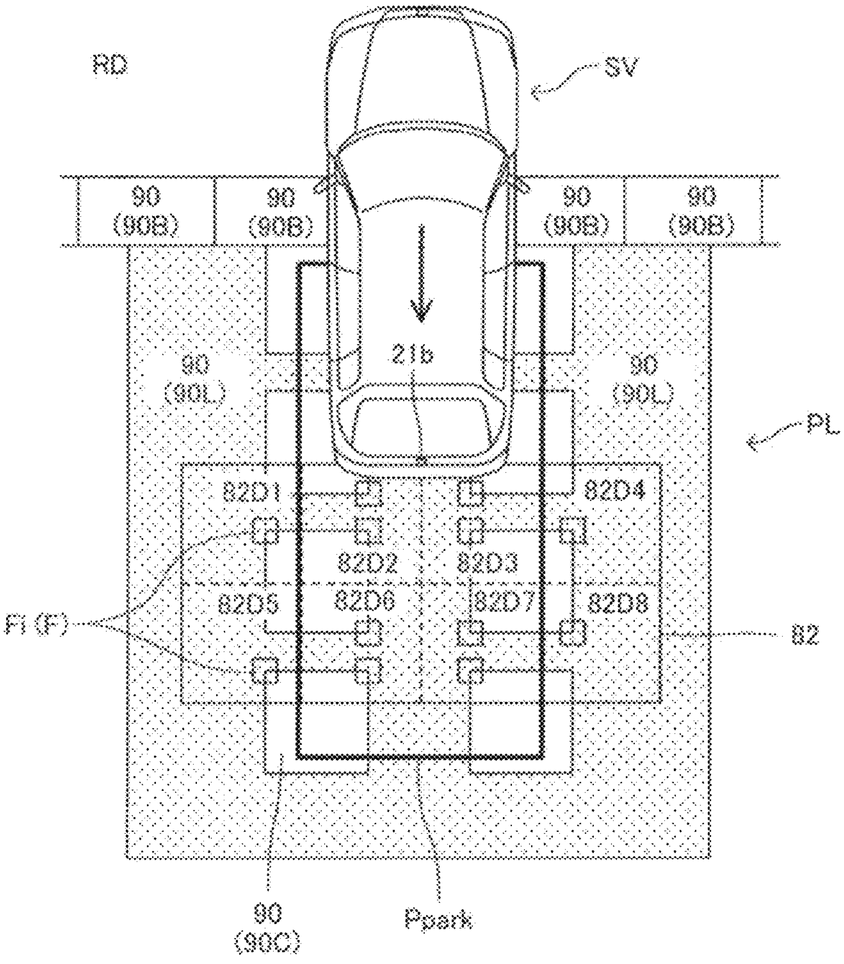
FIG. 14 is a diagram showing inside feature points extracted from the rear bird's-eye view image at the registration mode.

The VCECU calculates position estimating accuracy of the vehicle SV with respect to the parking position Ppark in a process of moving the vehicle SV to the parking position Ppark along the target route Rgt. When it is determined that the position estimating accuracy has become more than or equal to a predetermined accuracy threshold, the VCECU extracts, as shown in FIG. 14, a predetermined number (12 in the present embodiment) of the feature points F from the rear bird's-eye view image acquired from the PVM-ECU 20 at this timing. The position estimating accuracy of the vehicle SV with respect to the parking position Ppark becomes higher as estimating accuracy of a moving amount of the vehicle SV becomes higher. The estimating accuracy of a moving amount of the vehicle SV is relatively low while the vehicle SV is turning whereas is relatively high while the vehicle SV is moving straight. After the parking assist control for registration is started, it is when the vehicle SV moves backward (reverses) and a part thereof has entered inside the parking position Ppark (refer to FIG. 14) that the vehicle SV starts to move straight. Thus, when it is determined that the position estimating accuracy of the vehicle SV with respect to the parking position Ppark has become more than or equal to the accuracy threshold as a result of the vehicle SV moving backward and a part thereof having entered inside the parking position Ppark, and as a result, the VCECU extracts the feature points F from the rear bird's-eye view image. In the present embodiment, the VCECU extracts two feature points F from each of the divided regions 82D2, 82D3, 82D6, and 82D7, and extracts one feature point F from each of the divided regions 82D1, 82D4, 82D5, and 82D8.

Most of the feature points F extracted in this way are present inside the parking position Ppark. Therefore, hereinafter, the feature point F extracted at a timing when the position estimating accuracy of the vehicle SV with respect to the parking position Ppark has become more than or equal to the accuracy threshold will be referred to as an "inside feature point Fi". The VCECU stores in the RAM thereof the gray level information, the coordinate (x, z), and the angle θ of each of the inside feature points Fi. The inside feature points Fi are used when calculating the parking position Ppark at the parking assist mode. That is, the inside feature points Fi are not used for calculating the parking position Ppark at the registration mode.

When the vehicle SV moves backward by a predetermined distance after the inside feature points Fi are extracted, the VCECU extracts the inside feature points Fi again. This predetermined distance is set, for example, to a distance by which the rear bird's-eye view image will not overlap with the previous rear bird's-eye view image. However, when the vehicle SV is already parked in the parking position Ppark before the vehicle SV moves backward by the predetermined distance, the extraction of the inside feature points Fi is conducted only once.

Figure 15:
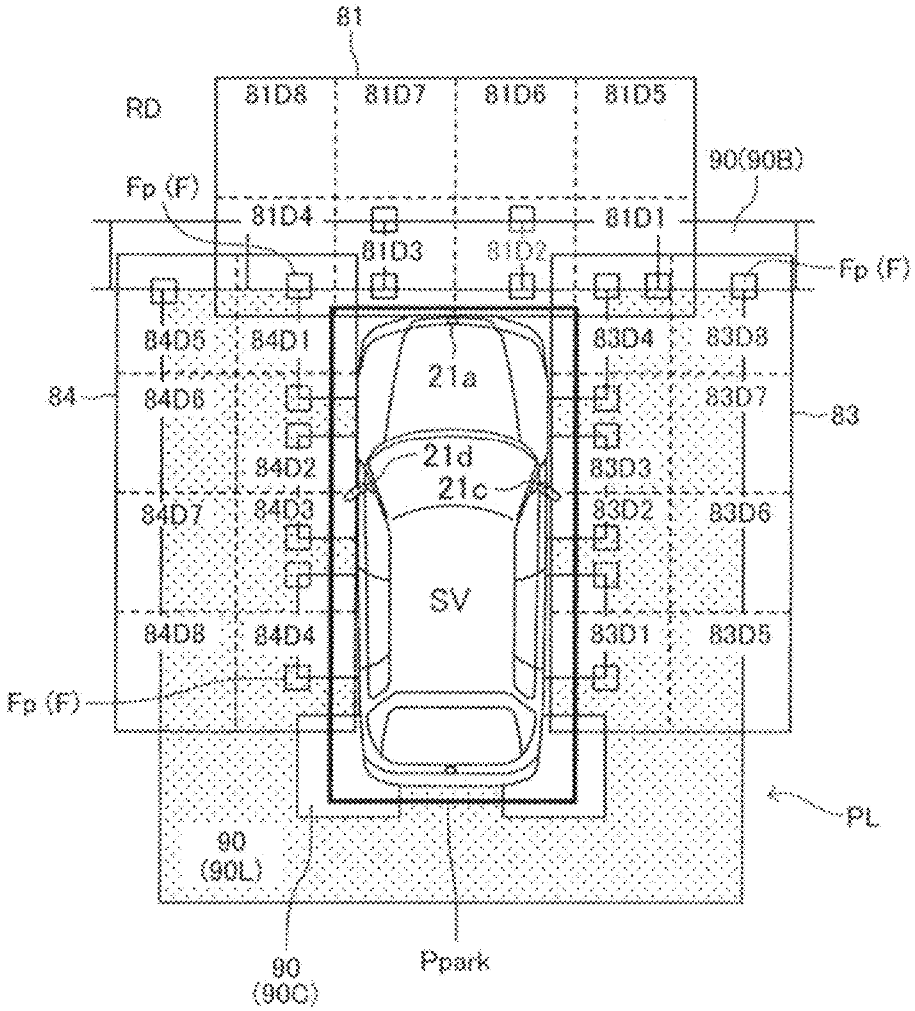
FIG. 15 is a diagram showing peripheral feature points extracted from the right, left, and front bird's-eye view images at the registration mode.

Next, the peripheral feature points Fp will be described. When the VCECU moves the vehicle SV to the parking position Ppark, the VCECU performs the breaking force automatic control to stop the vehicle SV, and thereafter shifts a position of the shift lever 72 to "P" by the shift position automatic control. In this way, the parking of the vehicle SV into the parking position Ppark is finished (completed). When it is determined that the parking has been finished, the VCECU extracts, as shown in FIG. 15, a predetermined number of the feature points F from each of the right bird's-eye view image, the left bird's-eye view image, and the front bird's-eye view image acquired from the PVM-ECU 20 at this timing. In the present embodiment, the VCECU is configured to extract 11 feature points F from each of the right and left bird's-eye view images, and 12 feature points F from the front bird's-eye view image (In FIG. 15, only a part of the feature points F are illustrated.). Specifically, concerning the right bird's-eye view image, the VCECU extracts two feature points F from each of the divided regions 83D2 to 83D4 and one feature point F from each of the divided regions 83D1, 83D5 to 83D8. Concerning the left bird's-eye view image, the VCECU extracts two feature points F from each of the divided regions 84D1 to 84D3 and one feature point F from each of the 84D4 to 84D8. Concerning the front bird's-eye view image, the VCECU extracts two feature points F from each of the divided regions 81D2, 81D3, 81D6, and 81D7 and one feature point F from each of the divided regions 81D1, 81D4, 81D5, and 81D8.

The feature points F extracted in this way are present around the parking position Ppark. Therefore, hereinafter, the feature point F extracted at a timing when the parking of the vehicle SV into the parking position Ppark has been finished will be referred to as a "peripheral feature point Fp". The VCECU stores in the RAM thereof the gray level information, the coordinate (x, z), and the angle θ of each of the peripheral feature points Fp. The peripheral feature points Fp are used when calculating the parking position Ppark at the parking assist mode. That is, the peripheral feature points Fp are not used for calculating the parking position Ppark at the registration mode. Hereinafter, the entrance feature points Fe, the inside feature points Fi, and the peripheral feature points Fp may be also collectively referred to as "feature points F".

When the VCECU has parked the vehicle SV in the parking position Ppark (that is, when the parking assist control for registration has been finished), the VCECU displays on the touch panel display 22 a parking position correction image (illustration omitted). The parking position correction image includes a composite bird's-eye view image in a left side region thereof, and a position operation button as well as a registration button in a right side region thereof. A parking position display frame indicating the parking position Ppark is displayed on the composite bird's-eye view image in a superimposed manner. The position operation button has a same configuration and function as the position operation button G3*b*, and is touched by the driver for a purpose of moving a position of the parking position display frame in the composite bird's-eye view image. The registration button is a button touched for a purpose of determining a position indicated by the parking position display frame as a registered parking position Ppark_reg, and finishing the registration mode.

Figure 16:
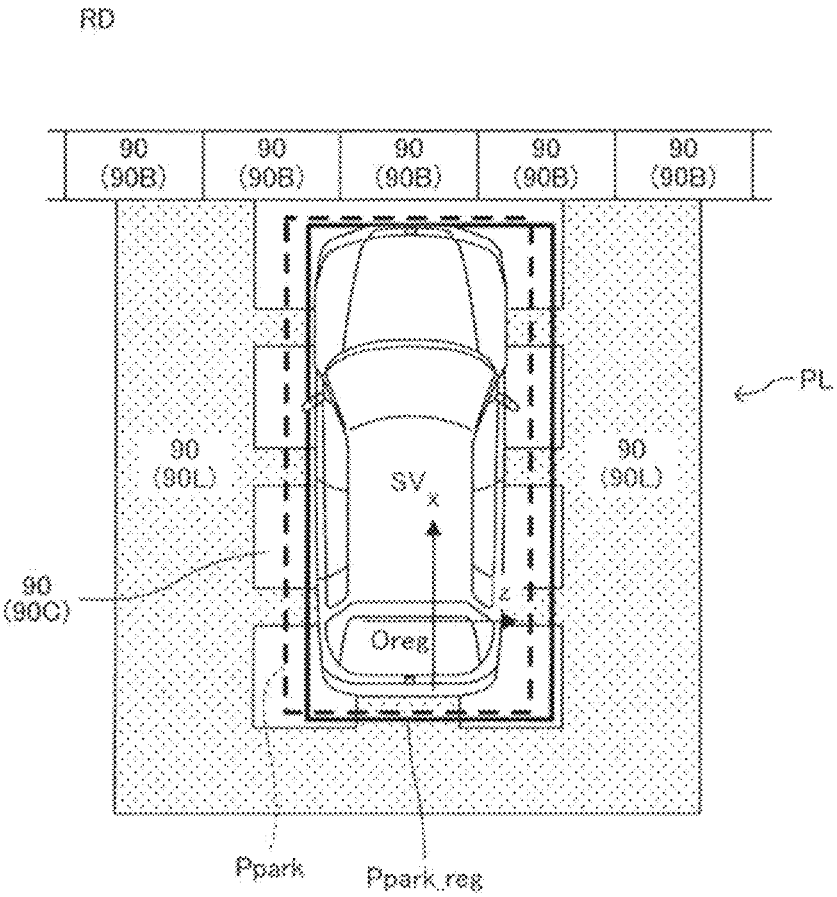
FIG. 16 is a diagram used to describe parking position correction processing.

The driver operates the position operation button and moves the position of the parking position display frame to a desired position, and thereby as shown in FIG. 16, the parking position Ppark (refer to a dashed line) can be corrected into a desired position (i.e., the registered parking position Ppark_reg (refer to a solid line)). When the registration button is touched, the VCECU displays on the touch panel display 22 a registration completion image (illustration omitted) indicating that the registration of the registered parking position Ppark_reg has been completed. In addition, the VCECU resets a coordinate system having an origin Oreg at a predetermined position with respect to the registered parking position Ppark_reg. The VCECU corrects the coordinate and the angle of each of the entrance/inside/peripheral feature points Fe, Fi, Fp into a coordinate (x, z) and an angle θ in the coordinate system reset, and stores them along with the gray level information in the non-volatile memory of the VCECU. In other words, the VCECU registers these feature points F in there. With this, the registration mode is finished.

(Parking Assist Mode)

Next, the parking assist mode will be described. Regarding same processing as the processing at the registration mode, a description thereof may be omitted.

When the parking assist switch 14 is operated under a state where the vehicle SV is stopped by the driver, the parking assist system is activated. When the parking assist system is activated in a case where the registered parking position Ppark_reg has been registered, first, the VCECU determines, just like a case at the registration mode, whether or not the second parking mode is feasible. When it is determined that the second parking mode is feasible, the VCECU displays on the touch panel display 22 the display image G1 (refer to FIG. 8). When the parking start button (illustration omitted) included in the display image G1 is touched, the parking assist control at the second parking mode is started.

Figure 17:
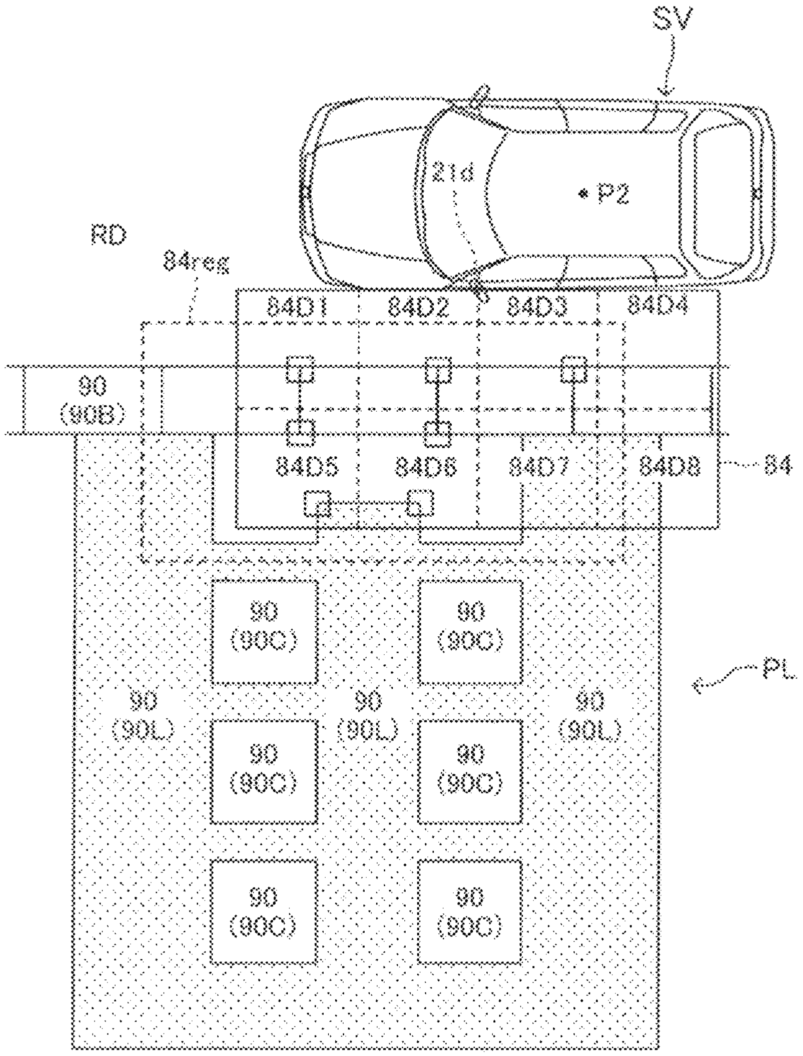
FIG. 17 is a diagram showing entrance feature points detected from the left bird's-eye view image at parking assist mode.

Here, when the registered parking position Ppark_reg has been registered, the VCECU executes, during a period where the vehicle SV is travelling at a vehicle speed less than or equal to a predetermined vehicle speed, the matching processing for the entrance feature points Fe in the right and left bird's-eye view images, each acquired every time the predetermined time elapses, and determines whether or not at least one entrance feature point Fe has been detected from either one of these images. When at least one entrance feature point Fe has been detected at a timing when the parking assist switch 14 has been operated (refer to FIG. 17), the VCECU displays a mode button (illustration omitted) on the composite image G1S2 (refer to FIG. 8) included in the right side region of the display image G1 in a superimposed manner. The mode button is a button for switching a mode between the second parking mode and the parking assist mode (strictly, the first parking mode for performing the parking assist control into the registered parking position Ppark_reg). It should be noted that when any entrance feature point Fe has not been detected at a timing when the parking assist switch 14 has been operated, the VCECU determines that it is impossible to perform the parking assist control into the registered parking position Ppark_reg, and does not display the mode button.

When the driver touches the mode button, the VCECU displays on the touch panel display 22 a parking assist image (illustration omitted). That is, the VCECU switches an image from the display image G1 to the parking assist image.

The parking assist image includes in a left side region thereof a camera's viewpoint image where a region toward a moving direction is seen from a position of the vehicle SV, and includes in a right side region thereof a composite bird's-eye view image as well as a parking start button (illustration omitted). When the camera's viewpoint image and the composite bird's-eye view image both include the registered parking position Ppark_reg, a parking position display frame indicating this registered parking position Ppark_reg is displayed on these images in a superimposed manner. It should be noted that this registered parking position Ppark_reg is a parking position calculated based on the detected entrance feature point(s) Fe. When the driver touches the parking start button, the VCECU performs the control (the parking assist control) for automatically parking the vehicle SV in the registered parking position Ppark_reg (in other words, starts the parking assist mode).

In a first half of the parking assist control, the VCECU executes same processing as the parking assist control for registration at the registration mode. That is, the VCECU executes, every time the predetermined time elapses, the "processing for setting a target route Rgt based on the registered parking position Ppark_reg calculated based on the entrance feature points Fe, and performing the various types of controls for moving the vehicle SV along this target route Rgt". It should be noted that when the entrance feature point(s) Fe comes not to be detected from any bird's-eye view images as a result of the vehicle SV having moved along the target route Rgt, the VCECU makes use of the latest target route Rgt among a plurality of the target routes Rgt set in the past as a target route Rgt at the current timing.

In a second half of the parking assist control, the VCECU executes, every time the predetermined time elapses, the matching processing using the bird's-eye view images (especially, the right, left, and rear bird's-eye view images) acquired from the PVM-ECU 20, and determines whether or not the peripheral feature point(s) Fp and/or the inside feature point(s) Fi are detected from these bird's-eye view images. When the peripheral and/or inside feature point(s) Fp, Fi has been detected, the VCECU calculates the registered parking position Ppark_reg based on the coordinate (x, z) and the angle θ of the detected peripheral and/or inside feature point(s) Fp, Fi. The VCECU sets a target route Rgt based on the registered parking position Ppark_reg, and performs the various types of controls for moving the vehicle SV along this target route Rgt. The VCECU executes the above processing every time the predetermined time elapses. In this way, the registered parking position Ppark_reg is calculated based not only on the entrance feature points Fe but also on the peripheral/inside feature points Fp, Fi (in other words, the registered parking position Ppark_reg is updated every time the predetermined time elapses), and thereby it becomes possible to calculate the registered parking position Ppark_reg with high accuracy.

As mentioned above, the registered parking position Ppark_reg is calculated based on the feature points F, and thus in order to maintain a calculation accuracy of the registered parking position Ppark_reg at a certain level, it is desirable that the feature points F are detected as many as possible. However, in a following three cases, it is likely that the feature points F extracted at the registration mode cannot be detected at the parking assist mode, resulting in the calculation accuracy of the registered parking position Ppark_reg being decreased. Hereinafter, specific description will be made regarding these three cases.

Figure 18:
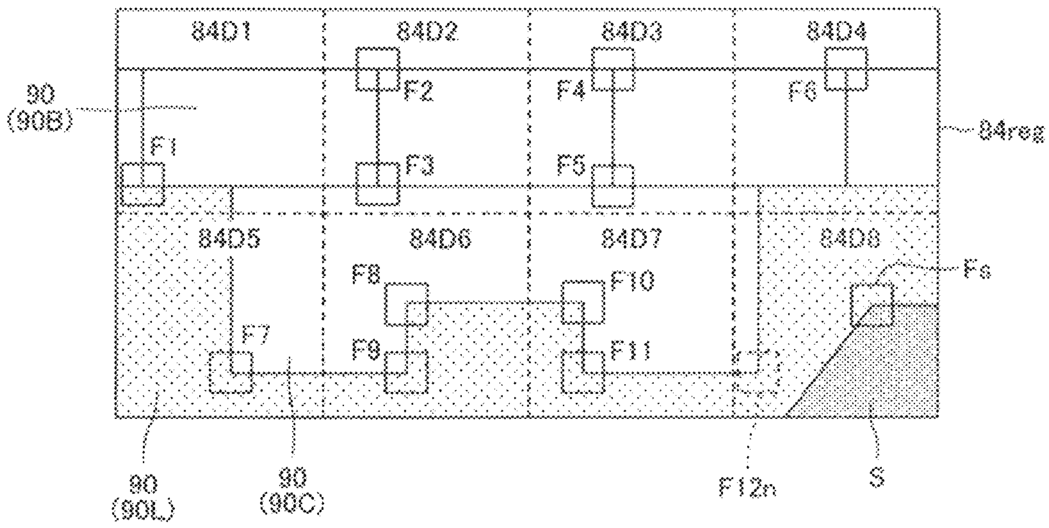
FIG. 18 is a diagram used to describe a case where an inappropriate feature point is extracted at registration mode.

Case 1: Case where an Inappropriate Feature Point(s) F is Extracted at the Registration Mode FIG. 18 is a diagram showing 12 feature points (feature points F1 to F11 and Fs) extracted from the capturing area 84 at the registration mode under a state where the vehicle SV is stopped at the position P1 (refer to FIG. 11). Hereinafter, a capturing area at the registration mode will be denoted as a capturing area reg for clarification. As shown in FIG. 18, shade S is present within the capturing area 84reg (in more detail, within the divided region 84D8), and a change in luminance is relatively large at a boundary between the shade S and the lawn 90L. Therefore, the VCECU extracts, as the feature point Fs, a corner part of the boundary between the shade S and the lawn 90L from the divided region 84D8. A position of the shade S changes with time. Therefore, it is highly likely that the feature point Fs cannot be detected at the parking assist mode.

It is not limited to when a feature point(s) F including the shade S is extracted that some situation applies to the case 1. For example, when extracting feature points F by starting the registration mode at nighttime, there may be a case where a boundary between a part lightened by a lamp and a part not lightened is extracted as a feature point F. In this case also, when the parking assist mode is performed during a daytime when the lamp is not being used, it is highly likely that this feature point F cannot be detected. That is, the case 1 is a case where an inappropriate feature point(s) F is extracted at the registration mode.

Figure 19:
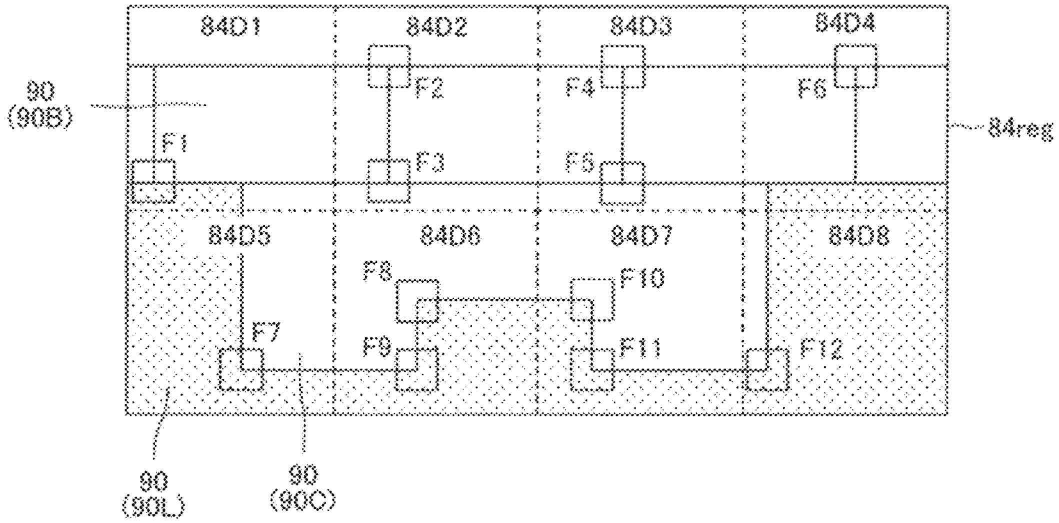
FIG. 19 is a diagram showing feature points extracted at the registration mode.
Figure 20:
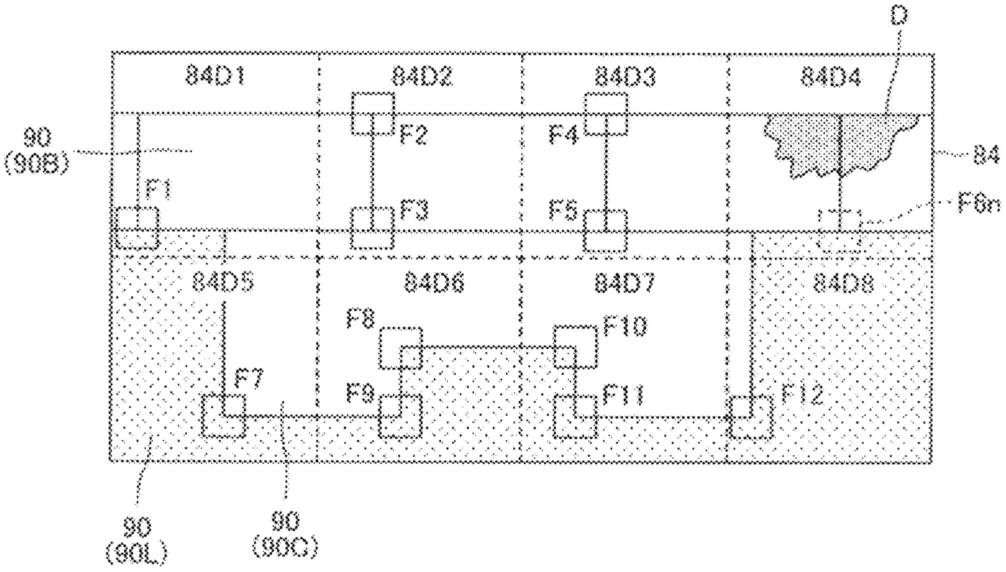
FIG. 20 is a diagram showing feature points detected at parking assist mode and used to describe a case where a condition of a ground has changed with time between at the registration mode and at the parking assist mode.

Case 2: Case where a Condition of the Ground 90 has Changed with Time Between at the Registration Mode and at the Parking Assist Mode FIG. 19 is a diagram showing 12 feature points F1 to F12 extracted from the capturing area 84reg at the registration mode under a state where the vehicle SV is stopped at the position P1 (refer to FIG. 11). As shown in FIG. 19, feature points that apply to the case 1 are not included among these feature points F1 to F12. FIG. 20 is a diagram showing 11 feature points (feature points F1 to F5 and feature points F7 to F12) detected from the capturing area 84 at the parking assist mode. It should be noted that the capturing area 84 coincides with the capturing area 84 reg in FIG. 19. As shown in FIG. 20, at a timing when this parking assist mode is performed, some time has elapsed from the registration mode, and thus dirt D is stuck on a block 90B included in the divided region 84D4. Therefore, a feature point F6 (refer to FIG. 19) extracted from the divided region 84D4 is not detected at the parking assist mode.

It is not limited to when the dirt D is stuck on the ground 90 that some situation applies to the case 2. For example, when the lawn 90L has grown or withered or when the ground 90 has got sunburned with lapse of time, there may be a case where a feature point F extracted at the registration mode is not detected at the parking assist mode. That is, the case 2 is a case where a condition of the ground 90 has changed with time between at the registration mode and at the parking assist mode.

Figure 21:
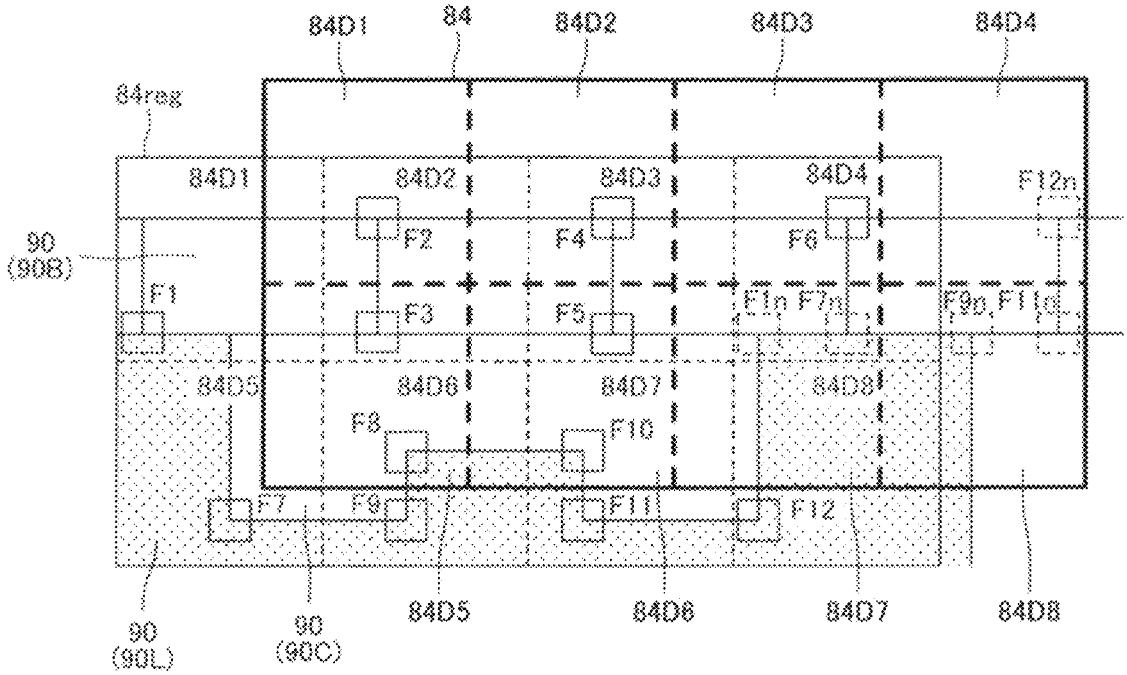
FIG. 21 is a diagram used to describe a case where feature points extracted at the registration mode are not included in a capturing area at the parking assist mode.

Case 3: Case where a Feature Point(s) F Extracted at the Registration Mode is not Included in a Capturing Area at the Parking Assist Mode FIG. 21 is a diagram showing 12 feature points F1 to F12 extracted from the capturing area 84reg at the registration mode under a state where the vehicle SV is stopped at the position P1 (refer to FIG. 11) as well as 7 feature points (feature points F2 to F6 and F8 to F10) extracted from the capturing area 84 at the parking assist mode under a state where the vehicle SV is stopped at the position P2 (refer to FIG. 17). Feature points that apply to the case 1 or the case 2 are not included among these feature points F1 to F12.

In an example of FIG. 21, the capturing area 84 at the parking assist mode is shifted from the capturing area 84reg at the registration mode, and thus at the parking assist mode, 5 feature points, F1, F7 F9, F11, and F12 are not detected. That is, the case 3 is a case where a feature point(s) F extracted at the registration mode is not included in a capturing area at the parking assist mode.

When a situation where a certain feature point F applies to either one of the above three cases has occurred consecutively every time the parking assist control (strictly, the parking assist control at the parking assist mode) is performed, the VCECU erases this feature point F from the non-volatile memory (in other words, erases this registered feature point F from a group of the registered feature points F), and extracts a new feature point F. A specific description will be made below.

The VCECU sets a count value cnt for each of the feature points F extracted at the registration mode. When a certain feature point F is detected even once while the parking assist control is being performed, the VCECU stores in the RAM thereof this feature point F as a detection-finished entrance feature point Fd. When the parking assist control is finished, the VCECU updates the count values cnt of all the feature points F (that is, the entrance feature points Fe, the inside feature points Fi, and the peripheral feature points Fp) extracted at the registration mode. Specifically, when a certain feature point F is stored in the RAM as the detection-finished entrance feature point Fd, the VCECU updates the count value cnt of this feature point F in accordance with a following expression (1). On the other hand when a certain feature point F is stored in the RAM as the feature point F, not as the detection-finished entrance feature point Fd (in other words, when this feature point F has not been detected even once while the parking assist control is being performed), the VCECU updates the count value cnt of this feature point F in accordance with a following expression (2). It should be noted that an initial value of the count value cnt is set to 5 in the present embodiment.

$$cnt=\min(5,\ cnt+3) \tag{1}$$

$$cnt=cnt-1 \tag{2}$$

After the count value cnt is updated, the VCECU determines whether or not there are any feature points F, each having the count value cnt=0, and when exists, erases this feature point(s) F from the non-volatile memory. For example, when a following situation has occurred 5 consecutive times, where a feature point F having a current count value cnt=5 is not detected even once while the parking assist control is being performed owing to this feature point F applying to either one of the cases 1 to 3, this feature point F is erased. It should be noted that the initial value of the count value cnt and numbers used in the expression (1) are not limited to the values mentioned above, but may be changed accordingly. In addition, a following expression of cnt=N (N: a predetermined integer) may be adopted instead of the expression (1).

When the feature point(s) F is erased, the VCECU newly extracts a same number of feature point(s) F as the number of the erased feature point(s) F from the corresponding bird's-eye view image. A specific description will be made below.

When the entrance feature point(s) Fe is erased, the VCECU newly extracts the same number of the entrance feature point(s) Fe from a "bird's-eye view image for entrance feature point" described later. The "bird's-eye view image for entrance feature point" is a right bird's-eye view image or a left bird's-eye view image acquired from the PVM-ECU 20 at a timing when the parking assist mode is started. That is, as mentioned above, at a timing when the parking start button of the parking assist mode has been touched, at least one entrance feature point Fe has been already detected from either one of the right bird's-eye view image or the left bird's-eye view image. Therefore, the VCECU stores, as the "bird's-eye view image for entrance feature point", a bird's-eye view image including the entrance feature point(s) Fe which have been already detected (that is, the right or left bird's-eye view image) in the RAM thereof. For example, in FIG. 21, in a case where the parking assist mode is started when the vehicle SV is positioned at the position P2 (refer to FIG. 17), the VCECU stores, as the "bird's-eye view image for entrance feature point", the left bird's-eye view image of the capturing area 84 (refer to a thick frame in FIG. 21) in the RAM at a timing when the parking assist mode is started.

Thereafter, the VCECU reads this "bird's-eye view image for entrance feature point" at a timing when the parking assist control has been finished, and determines whether or not a new entrance feature point(s) Fe is extractable from a same divided region as the divided region where the erased entrance feature point(s) F had been included. When it is determined to be extractable, the VCECU extracts a new entrance feature point(s) Fe from the same divided region. On the other hand, when it is determined not to be extractable, the VCECU extracts a new entrance feature point(s) Fe from a whole "bird's-eye view image for entrance feature point". The VCECU stores in the non-volatile memory thereof gray level information, a coordinate (x, z), and an angle θ of each of the new entrance feature point(s) extracted (in other words, registers the new entrance feature point(s) Fe in association with the registered parking position Ppark_reg).

For example, in an example of FIG. 18, the feature point Fs applies to the case 1. Therefore, assuming that the count value cnt of the feature point Fs is set to 5, when a "situation where the feature point Fs is not detected while the parking assist control is being performed" occurs 5 consecutive times, this feature point Fs is erased at a timing when the parking assist control has been finished. Here, provided that a capturing area 84 of the "bird's-eye view image for entrance feature point" coincides with the capturing area 84reg, the divided region 84D8 where the feature point Fs had been included includes an extractable feature point F12*n*, and thus the VCECU extracts from this divided region 84D8 the feature point F12*n* as a new entrance feature point Fe.

On the other hand, provided that the capturing area 84 of the "bird's-eye view image for entrance feature point" does not coincide with the capturing area 84reg and that the feature point Fs is included in, for example, the divided region 84D6 of the "bird's-eye view image for entrance feature point", the VCECU determines whether or not a new entrance feature point(s) Fe is extractable from the divided region 84D6 of the "bird's-eye view image for entrance feature point". When it is determined to be extractable, the VCECU extracts this new entrance feature point(s) Fe from the divided region 84D6. In contrast, when it is determined not to be extractable, the VCECU extracts a new entrance feature point(s) Fe from the whole "bird's-eye view image for entrance feature point".

It should be noted that the feature point Fs will be erased in a following case as well, in addition to a case where the situation where the feature point Fs is not detected occurs 5 consecutive times. That is, when a situation where the feature point Fs is not detected occurs 4 consecutive times, resulting in the count value cnt of the feature point Fs having become 1, and thereafter the shade S is present in the capturing area 84 while a subsequent parking assist control is being performed and thereby the feature point Fs is accidentally detected, the count value cnt thereof is updated to 4 according to the expression (1). In this case, after this, if a situation where the feature point Fs is not detected occurs 4 consecutive times, the feature point Fs is erased at a timing when the parking assist control has been finished.

In addition, in examples of FIG. 19 and FIG. 20, the feature point F6 (refer to FIG. 19) applies to the case 2. Therefore, assuming that the count value cnt of the feature point F6 is set to 5, when a "situation where the feature point F6 is not detected while the parking assist control is being performed" occurs 5 consecutive times, this feature point F6 is erased at a timing when the parking assist control has been finished. Here, the capturing area 84 (refer to FIG. 20) of the "bird's-eye view image for entrance feature point" coincides with the capturing area 84reg (FIG. 19), and the divided region 84D4 where the feature point F6 had been included includes an extractable feature point F6*n*, and thus the VCECU extracts from this divided region 84D4 the feature point F6*n* as a new entrance feature point Fe.

Further, in an example of FIG. 21, the feature points F1, F7, F9, F11, and F12 apply to the case 3. Therefore, assuming that the count values cnt of these 5 feature points are each set to 5, when a "situation where these 5 feature points are not detected while the parking assist control is being performed" occurs 5 consecutive times, these 5 feature points are erased at a timing when the parking assist control has been finished. Here, as shown in FIG. 21, these 5 erased feature points F are not included in the capturing area 84 of the "bird's-eye view image for entrance feature point", and thus the VCECU determines whether or not 5 feature points F are newly extractable from the whole "bird's-eye view image for entrance feature point". In this example, two feature points F1*n* and F7*n* are newly extractable from the divided region 84D7, two feature points F9*n* and F11*n* are newly extractable from the divided region 84D8, and one feature point F12*n* is newly extractable from the divided region 84D4. Therefore, the VCECU extracts these 5 feature points F as new entrance feature points Fe.

When a peripheral feature point(s) Fp and/or an inside feature point(s) Fi are erased, the VCECU newly extracts a same number of peripheral feature point(s) Fp as the number of the erased peripheral feature point(s) Fp and/or a same number of inside feature point(s) Fi as the number of the erased inside feature point(s) Fi from "bird's-eye view images for peripheral feature point" and/or a "bird's-eye view image for inside feature point", respectively (each will be described later).

The "bird's-eye view image for inside feature point" is a rear bird's-eye view image acquired from the PVM-ECU 20 at a timing when the position estimating accuracy of the vehicle SV with respect to the registered parking position Ppark_reg has become more than or equal to the accuracy threshold (that is, at a timing when the vehicle SV moves backward and a part thereof has entered inside the registered parking position Ppark_reg).

The "bird's-eye view images for peripheral feature point" are a right bird's-eye view image, a left bird's-eye view image, and a front bird's-eye view image, each acquired from the PVM-ECU 20 at a timing when the parking assist control has been finished (that is, at a timing when the vehicle SV has been moved into the registered parking position Ppark_reg).

A method for newly extracting peripheral feature point(s) Fp and inside feature point(s) Fi is same as the method for newly extracting entrance feature point(s) Fe. That is, the VCECU acquires the "bird's-eye view images for peripheral feature point" and reads the "bird's-eye view image for inside feature point" at a timing when the parking assist control has been finished, and determines whether or not a new peripheral feature point(s) Fp and a new inside feature point(s) Fi are extractable from same divided regions as the divided regions where the erased peripheral feature point(s) Fp and the erased inside feature point(s) Fi had been included, respectively. When it is determined to be extractable, the VCECU extracts a new peripheral feature point(s) Fp and new inside feature point(s) Fi from the same divided regions, respectively. On the other hand, when it is determined not to be extractable, the VCECU extracts a new peripheral feature point(s) Fp and new inside feature point(s) Fi from a whole "bird's-eye view images for peripheral feature point" and a whole "bird's-eye view image for inside feature point", respectively. The VCECU stores in the non-volatile memory thereof gray level information, a coordinate (x, z), and an angle θ of each of the new peripheral feature point(s) Fp and the new inside feature point(s) Fi extracted (in other words, registers the new peripheral/inside feature point(s) Fp, Fi in association with the registered parking position Ppark_reg).

After the above processing is finished, the VCECU finishes the parking assist mode. It should be noted that a following configuration may be adopted where a new feature point(s) F is extracted from a predetermined area (for example, a circular shaped area or a square shaped area) having the erased feature point F at a center thereof (or including the erased feature point F at an arbitrary position thereof) instead of a new feature point(s) F being extracted from the same divided region as the divided region where the erased feature point(s) F had been included.

<Specific Operation>

(Registration Mode)

Figure 22:
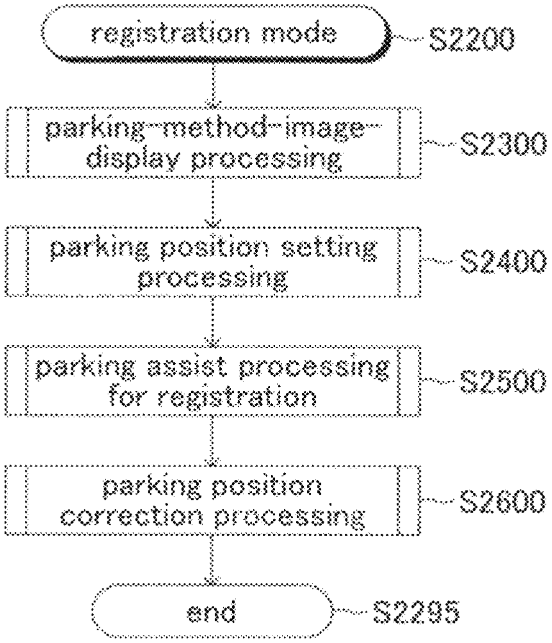
FIG. 22 is a flowchart showing a routine at the registration mode performed by CPU of vehicle control ECU shown in FIG. 1.

When the registration mode is started, the CPU of the VCECU executes a routine shown by a flowchart in FIG. 22 every time the predetermined time elapses.

Therefore, when the registration mode is started, the CPU initiates processing from a step 2200 in FIG. 22 and executes the parking-method-image-display processing at a step 2300, the parking position setting processing at a step 2400, the parking assist processing for registration at a step 2500, and the parking position correction processing at a step 2600 in this order.

Figure 23:
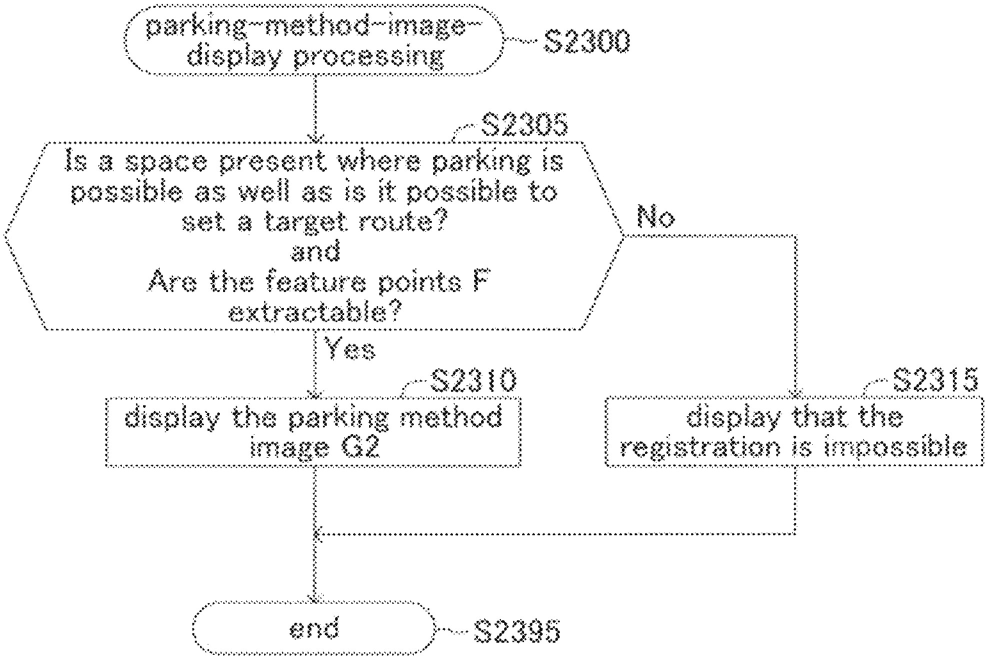
FIG. 23 is a flowchart showing a routine of parking-method-image-display processing among the registration mode performed by the CPU.

When proceeding to the step 2300, the CPU executes a routine (the parking-method-image-display processing) shown by a flowchart in FIG. 23. The CPU starts processing from the step 2300 in FIG. 23 and proceeds to a step 2305 to determine whether or not a space is present in the right side region and the left side region where the perpendicular parking and/or the parallel parking are/is possible as well as whether or not it is possible to set a target route Rgt to this space (the parking determination). Besides, the CPU determines whether or not the feature points F are extractable from the right and left bird's-eye view images (the feature point determination).

When the CPU makes an "Yes" determination in both the parking determination and the feature point determination (S2305: Yes), the CPU determines that the registration of a parking position by means of any one of the parking methods is possible, and proceeds to a step 2310 to display the parking method image G2 on the touch panel display 22. Thereafter, the CPU proceeds to a step 2395 at a timing when any one of the parking method selection buttons G2*a* to G2*d* has been touched to terminate the parking-method-image-display processing, and proceeds to the step 2400 in FIG. 24.

In contrast, when the CPU makes a "No" determination in at least one of the parking determination and the feature point determination (S2305: No), the CPU determines that the registration of a parking position is impossible, and proceeds to a step 2315 to display on the touch panel display 22 the message that the registration of a parking position is impossible. Thereafter, the CPU proceeds to the step 2395 to terminate the parking-method-image-display processing as well as the registration mode.

Figure 24:
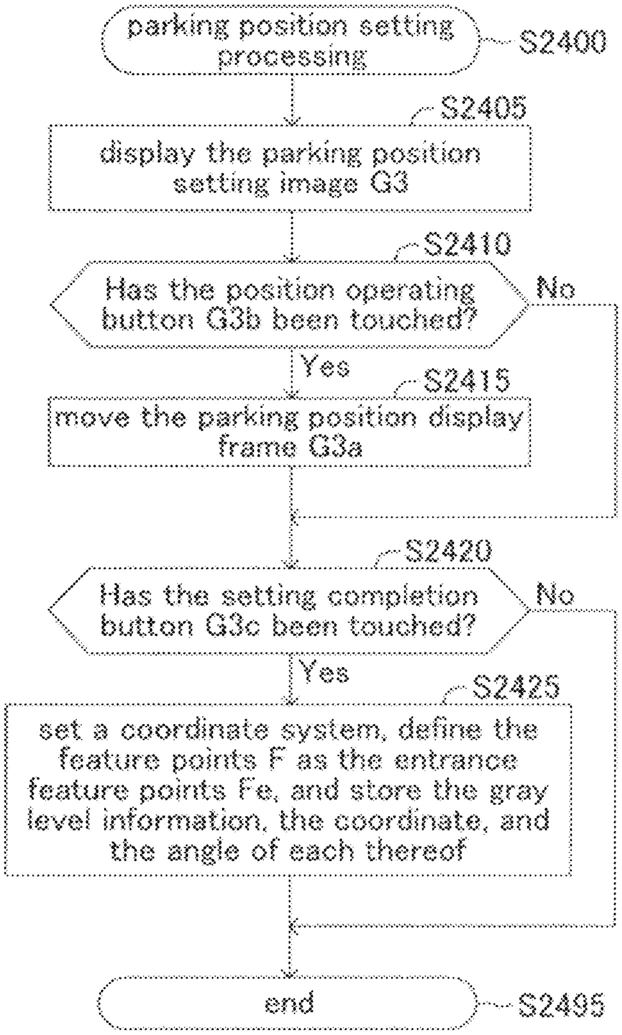
FIG. 24 is a flowchart showing a routine of parking position setting processing among the registration mode performed by the CPU.

When proceeding to the step 2400, the CPU executes a routine (the parking position setting processing) shown by a flowchart in FIG. 24. The CPU starts processing from the step 2400 in FIG. 24 and proceeds to a step 2405 to display the parking position setting image G3 on the touch panel display 22. Thereafter, the CPU proceeds to a step 2410 to determine whether or not the position operation button G3*b* has ben touched. When the CPU makes a "No" determination at the step 2410 (S2410: No), the CPU proceeds to a step 2420 to determine whether or not the setting completion button G3*c* has been touched. When the CPU makes a "No" determination at the step 2420 (S2420: No), the CPU proceeds to a step 2495 to tentatively terminate the present routine.

When the CPU makes an "Yes" determination at the step 2410 (S2410: Yes) in a midst of repeating the above processing, the CPU proceeds to a step 2415 to move a position of the parking position display frame G3*a* in the composite image G3S. Thereafter, the CPU proceeds to the step 2420 to determine whether or not the setting completion button G3*c* has been touched. When the CPU makes an "Yes" determination at the step 2420 (S2420: Yes), the CPU proceeds to a step 2425 to set a coordinate system for the parking position Ppark, define the feature points F determined to be extractable by the feature point determination at the step 2305 as the entrance feature points Fe, and store the gray level information, the coordinate (x, z), and the angle θ of each thereof in the RAM of the VCECU. In other words, the CPU stores a positional relationship between the entrance feature points Fe and the parking position Ppark. Thereafter, the CPU proceeds to the step 2495 to terminate the parking position setting processing, and proceeds to the step 2500 in FIG. 25.

Figure 25:
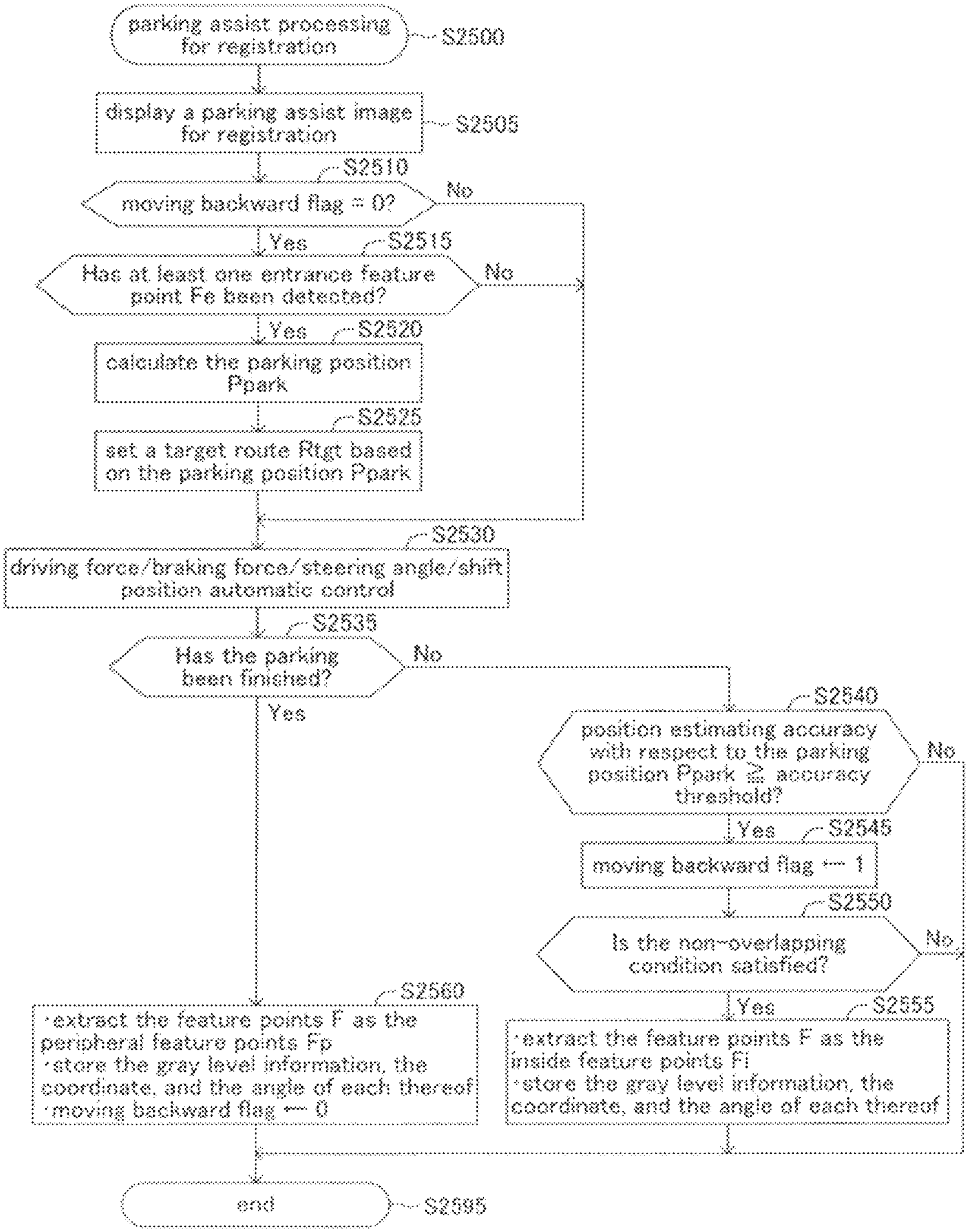
FIG. 25 is a flowchart showing a routine of parking assist processing for registration among the registration mode performed by the CPU.

When proceeding to the step 2500, the CPU executes a routine (the parking assist processing for registration) shown by a flowchart in FIG. 25. The CPU starts processing from the step 2500 in FIG. 25 and proceeds to a step 2505 to display the parking assist image for registration on the touch panel display 22. Thereafter, the CPU proceeds to a step 2510 to determine whether or not a value of a moving backward flag is 0. The moving backward flag is a flag indicating whether or not the position estimating accuracy of the vehicle SV with respect to the parking position Ppark is more than or equal to the accuracy threshold. A value of the moving backward flag is set to 1 when the position estimating accuracy is more than or equal to the accuracy threshold and is set to 0 when the position estimating accuracy is less than the accuracy threshold.

When it is determined that a value of the moving backward flag is 0 (S2510: Yes), the CPU proceeds to a step 2515 to determine whether or not at least one entrance feature point Fe has been detected. When the CPU makes an "Yes" determination at the step 2515 (S2515: Yes), the CPU calculates, at a step 2520, the parking position Ppark based on the entrance feature point(s) Fe. Thereafter, the CPU proceeds to a step 2525 to set a target route Rgt based on the parking position Ppark, and executes, at a step 2530, the various types of controls for moving the vehicle SV along the target route Rgt.

Thereafter, the CPU proceeds to a step 2535 to determine whether or not the parking of the vehicle SV into the parking position Ppark has been finished. When the CPU makes a "No" determination at the step 2535 (S2535: No), the CPU determines, at a step 2540, whether or not the position estimating accuracy of the vehicle SV with respect to the parking position Ppark is more than or equal to the accuracy threshold. As mentioned above, it is when the vehicle SV moves backward and a part thereof has entered inside the parking position Ppark (in other words, a timing when the vehicle SV starts to move straight in a backward direction) that the position estimating accuracy becomes more than or equal to the accuracy threshold. Therefore, the CPU makes a "No" determination at the step 2540 (S2540: No) until the vehicle SV moves backward and a part thereof enters inside the parking position Ppark, and thereafter, proceeds to a step 2595 to tentatively terminate the present routine.

When any entrance feature point Fe comes not to be detected even by means of the rear camera 21*b* as a result of the vehicle SV having moved along the target route Rgt by repeating the above processing, the CPU makes a "No" determination at the step 2515 (S2515: No). In this case, the CPU proceeds to the step 2530 and performs the various types of controls for moving the vehicle SV along the target route Rgt calculated at the latest period.

Thereafter, the CPU proceeds to the step 2535 and when the CPU makes a "No" determination (S2535: No), the CPU makes a determination at the step 2540. When a part of the vehicle SV has not entered inside the parking position Ppark yet (in other words, when the vehicle SV has not been moving straight in the backward direction), the CPU makes a "No" determination at the step 2540 (S2540: No), and thereafter, proceeds to the step 2595 to tentatively terminate the present routine.

When the CPU makes an "Yes" determination at the step 2540 (S2540: Yes) in a midst of repeating the above processing, the CPU proceeds to a step 2545 to set a value of the moving backward flag to 1. Subsequently, the CPU proceeds to a step 2550 to determine whether or not a non-overlapping condition that "the feature points F extractable from the rear bird's-eye view image at the current period are not overlapping with the feature points F already extracted from the rear bird's-eye view image" is satisfied (in other words, whether or not there are non-overlapping feature points F in the rear bird's-eye view image at the current period). In a case where an "Yes" determination has been made for the first time at the step 2540, the processing for extracting the feature points F from the rear bird's-eye view image has not been executed yet, and therefore the CPU makes an "Yes" determination at the step 2550 (S2550: Yes). Thereafter, the CPU proceeds to a step 2555 to extract the feature points F as the inside feature points Fi from the rear bird's-eye view image acquired at the current period, and stores in the RAM of the VCECU the gray level information, the coordinate (x, z), and the angle θ of each thereof. In other words, the CPU stores a positional relationship between the inside feature points Fi and the parking position Ppark. Thereafter, the CPU proceeds to the step 2595 to tentatively terminate the present routine.

The CPU repeats the processing described above, and makes a determination at the step 2510 via the step 2505. At this point, a value of the moving backward flag has been set to 1 at the step 2545, and therefore the CPU makes a "No" determination at the step 2510 (S2510: No), and performs, at the step 2530, the various types of controls for moving the vehicle SV along the target route Rgt calculated at the latest period. When the vehicle SV moves backward and once a part thereof has entered inside the parking position Ppark, the position estimating accuracy of the vehicle SV with respect to the parking position Ppark becomes more than or equal to the accuracy threshold until the parking of the vehicle SV into the parking position Ppark is finished. Therefore, after the processing at the step 2530, when the CPU makes a "No" determination at the step 2535 (S2535: No), the CPU makes an "Yes" determination at the step 2540 (S2540: Yes), and makes a determination at the step 2550 again via the step 2545. When the non-overlapping condition is not satisfied (that is, more than or equal to at least one of the feature points F extractable from the rear bird's-eye view image at the current period is overlapping with the feature points F already extracted from the rear bird's-eye view image) (S2550: No), the CPU proceeds to the step 2595 to tentatively terminate the present routine.

When the CPU makes an "Yes" determination at the step 2535 (S2535: Yes) in a midst of repeating the above processing, the CPU proceeds to a step 2560 to extract the feature points F as the peripheral feature points Fp from each of the right, left, and front bird's-eye view images acquired at the current period, and stores in the RAM of the VCECU the gray level information, the coordinate (x, z), and the angle θ of each thereof. In other words, the CPU stores a positional relationship between the peripheral feature points Fp and the parking position Ppark. Besides, the CPU sets (initializes) a value of the moving backward flag to 0. Thereafter, the CPU proceeds to the step 2595 to terminate the parking assist processing for registration, and proceeds to the step 2600 in FIG. 26.

Figure 26:
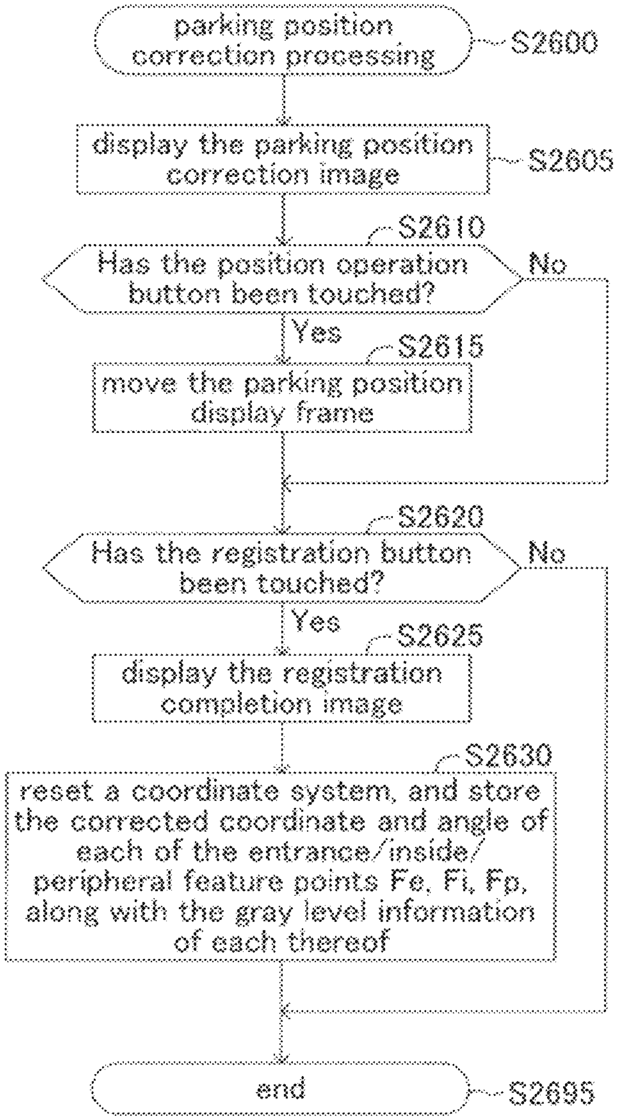
FIG. 26 is a flowchart showing a routine of the parking position correction processing among the registration mode performed by the CPU.

When proceeding to the step 2600, the CPU executes a routine (the parking position correction processing) shown by a flowchart in FIG. 26. The CPU starts processing from the step 2600 in FIG. 26 and proceeds to a step 2605 to display the parking position correction image on the touch panel display 22. Thereafter, the CPU determines, at a step 2610, whether or not the position operation button has been touched. When the CPU makes a "No" determination at the step 2610 (S2610: No), the CPU proceeds to a step 2620 to determine whether or not the registration button has been touched. When the CPU makes a "No" determination at the step 2620 (S2620: No), the CPU proceeds to a step 2695 to tentatively terminate the present routine.

When the CPU makes an "Yes" determination at the step 2610 (S2610: Yes) in a midst of repeating the above processing, the CPU proceeds to a step 2615 to move a position of the parking position display frame in the composite bird's-eye view image. Thereafter, the CPU proceeds to the step 2620 to determine whether or not the registration button has been touched. When the CPU makes an "Yes" determination at the step 2620 (S2620: Yes), the CPU displays, at a step 2625, the registration completion image on the touch panel display 22, and proceeds to a step 2630. At the step 2630, the CPU resets a coordinate system for the registered parking position Ppark_reg, and stores in the non-volatile memory of the VCECU the corrected coordinate (x, z) and angle θ of each of the entrance/inside/peripheral feature points Fe, Fi, Fp along with the gray level information of each thereof. In other words, the CPU stores a positional relationship between the entrance/inside/peripheral feature points Fe, Fi, Fp and the registered parking position Ppark_reg. Thereafter, the CPU proceeds to the step 2695 to terminate the parking position correction processing, and proceeds to a step 2295 in FIG. 22 to terminate the registration mode.

(Parking Assist Mode)

Figure 27:
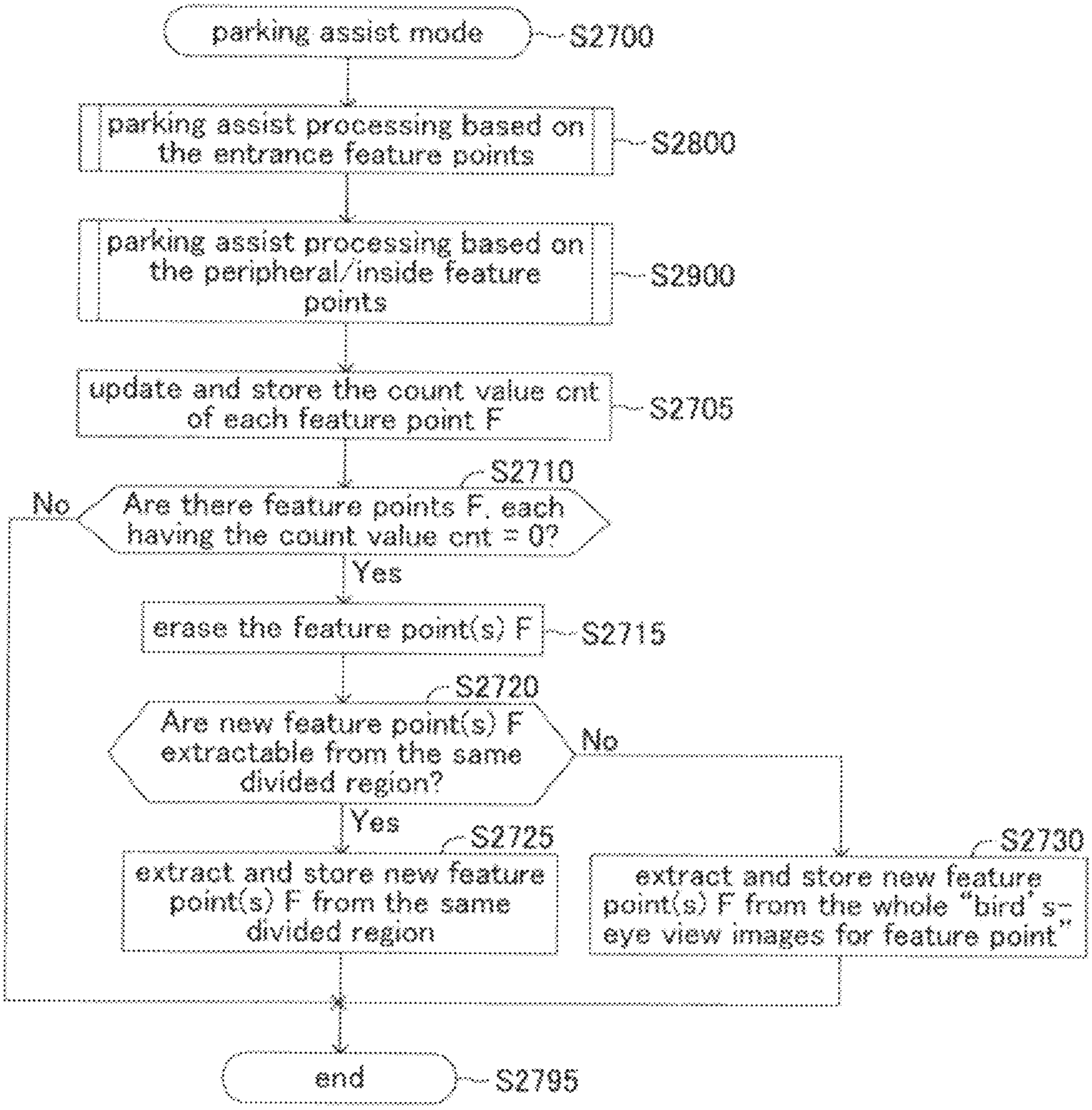
FIG. 27 is a flowchart showing a routine at the parking assist mode performed by the CPU.

When the parking assist mode is started, the CPU executes a routine shown by a flowchart in FIG. 27 every time the predetermined time elapses.

Therefore, when the parking assist mode is started, the CPU initiates processing from a step 2700 in FIG. 27 and executes the "parking assist processing based on the entrance feature points" at a step 2800 and the "parking assist processing based on the peripheral/inside feature points" at a step 2900 in this order.

Figure 28:
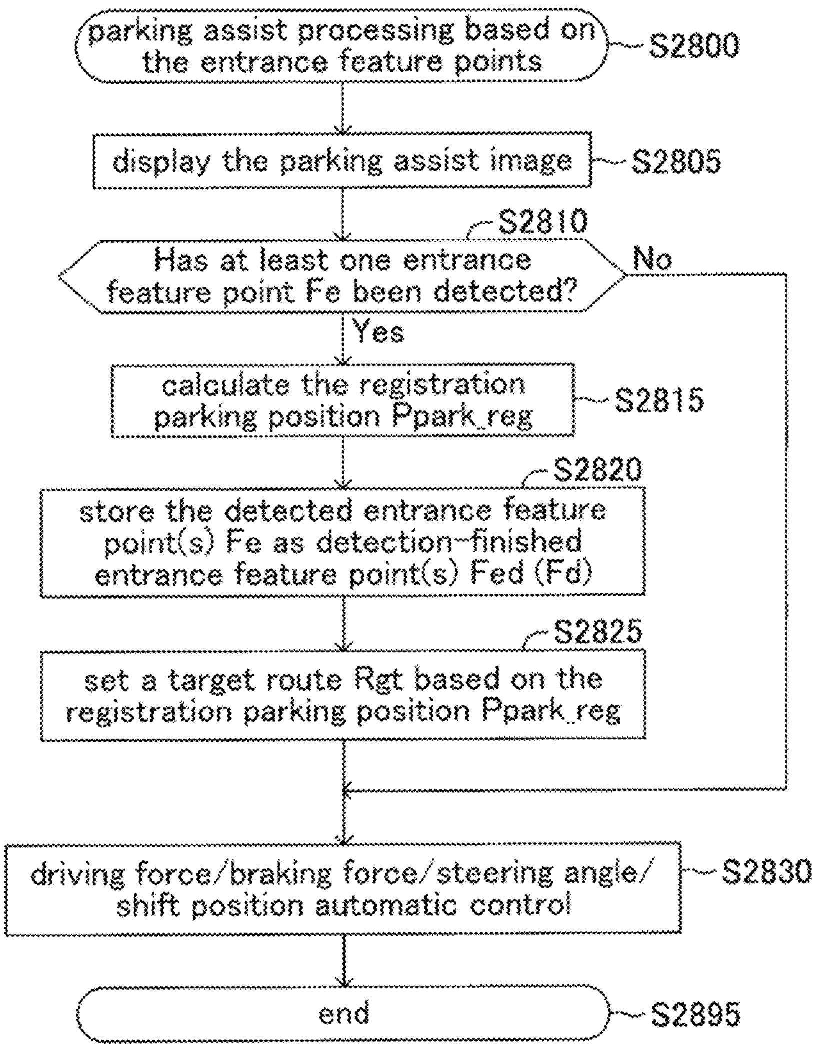
FIG. 28 is a flowchart showing a routine of parking assist processing based on the entrance feature points among the parking assist mode performed by the CPU.

When proceeding to the step 2800, the CPU executes a routine (the parking assist processing based on the entrance feature points) shown by a flowchart in FIG. 28. At a timing when the CPU starts processing at the step 2800 in FIG. 28, the CPU stores in the RAM of the VCECU a right bird's-eye view image or a left bird's-eye view image acquired from the PVM-ECU 20 as a "bird's-eye view image for entrance feature point". Thereafter, the CPU proceeds to a step 2805 to display the parking assist image on the touch panel display 22. Subsequently, the CPU determines, at a step 2810, whether or not at least one entrance feature point Fe has been detected. When the CPU makes an "Yes" determination (S2810: Yes), the CPU calculates, at a step 2815, the registered parking position Ppark_reg based on the entrance feature point(s) Fe. Thereafter, the CPU proceeds to a step 2820 to store in the RAM of the VCECU the detected entrance feature point(s) Fe as "detection-finished entrance feature point(s) Fed". Subsequently, the CPU proceeds to a step 2825 to set a target route Rgt based on the registered parking position Ppark_reg, and performs, at a step 2830, the various types of controls for moving the vehicle SV along this target route Rgt. Thereafter, the CPU proceeds to a step 2895 to tentatively terminate the present routine.

When any entrance feature point Fe comes not to be detected even by means of the rear camera 21*b* as a result of the vehicle SV having moved along the target route Rgt by repeating the above processing, the CPU makes a "No" determination at the step 2810 (S2810: No). In this case, the CPU proceeds to the step 2830 and performs the various types of controls for moving the vehicle SV along the target route Rgt calculated at the latest period. Thereafter, the CPU proceeds to the step 2895 to terminate the parking assist processing based on the entrance feature points, and proceed to the step 2900 in FIG. 29.

Figure 29:
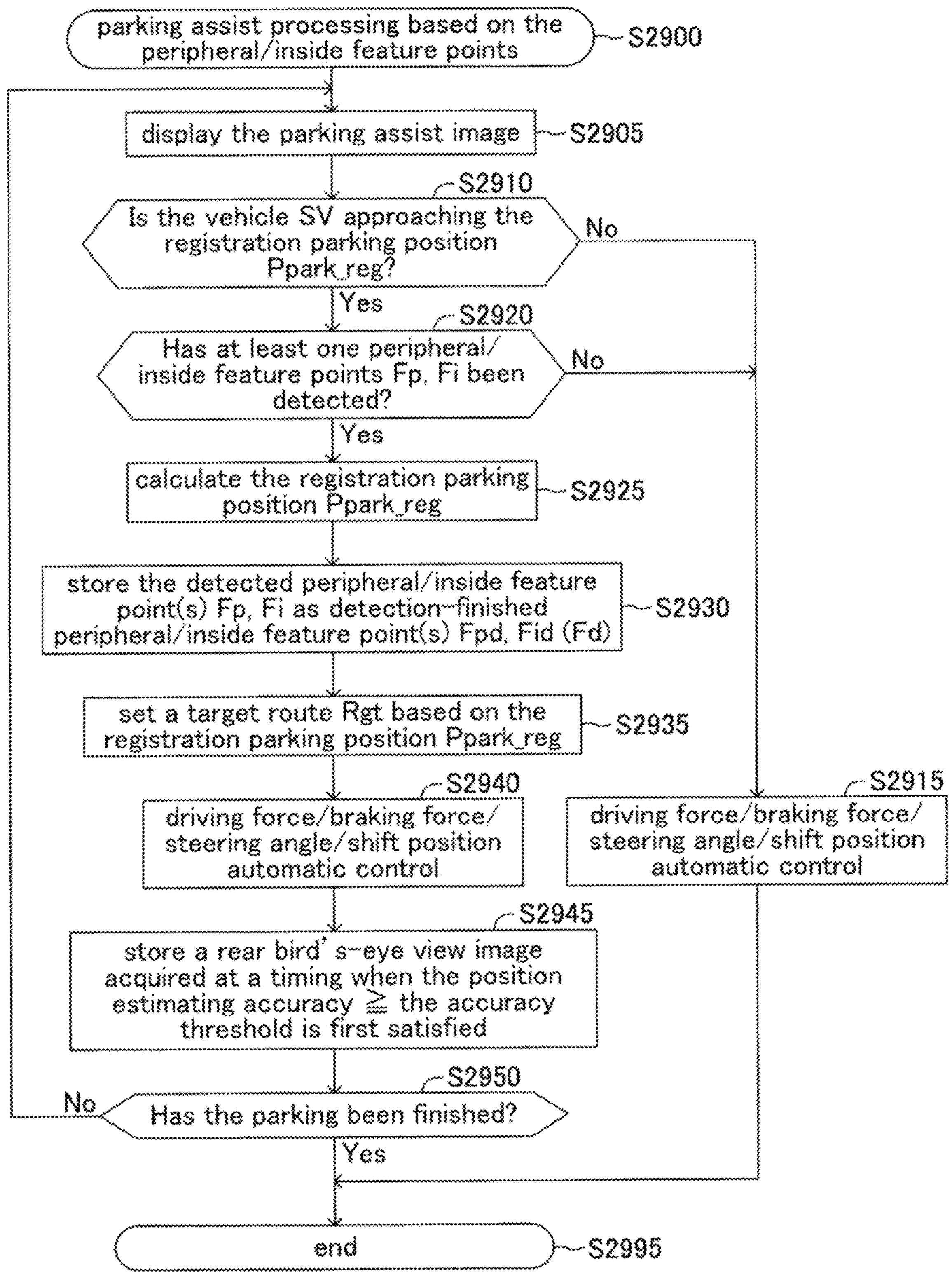
FIG. 29 is a flowchart showing a routine of parking assist processing based on the peripheral/inside feature points among the parking assist mode performed by the CPU.

When proceeding to the step 2900, the CPU executes a routine (the parking assist processing based on the peripheral/inside feature points) shown by a flowchart in FIG. 29. The CPU starts processing from the step 2900 in FIG. 29 and proceeds to a step 2905 to display the parking assist image on the touch panel display 22. Subsequently, the CPU determines, at a step 2910, whether or not the vehicle SV is approaching the registered parking position Ppark_reg. When a position of the shift lever 72 is "D", the CPU makes a "No" determination at the step 2910 (S2910: No). in this case, the CPU proceeds to a step 2915 to perform the various types of controls for moving the vehicle SV along the target route Rgt calculated at the latest period. Thereafter, the CPU proceeds to a step 2995 to tentatively terminate the present routine.

When a position of the shift lever 72 has been shifted to "R" in a midst of repeating the above processing, the CPU makes an "Yes" determination at the step 2910 (S2910: Yes), and proceeds to a step 2920 to determine whether or not at least one peripheral feature point Fp and/or inside feature point Fi has been detected. When the CPU makes a "No" determination (S2920: No), the CPU proceeds to the step 2915 to perform the various types of controls for moving the vehicle SV along the target route Rgt calculated at the latest period. Thereafter, the CPU proceeds to the step 2995 to tentatively terminate the present routine.

When the CPU makes an "Yes" determination at the step 2920 (S2920: Yes) in a midst of repeating the above processing, the CPU calculates, at a step 2925, the registered parking position Ppark_reg based on the peripheral feature point(s) Fp and/or the inside feature point(s) Fi. Subsequently, the CPU proceeds to a step 2930 to store in the RAM of the VCECU the detected peripheral feature point(s) Fp and/or the detected inside feature point(s) Fi as "detection-finished peripheral feature point(s) Fpd" and/or "detection-finished inside feature point(s) Fid". Thereafter, the CPU proceeds to a step 2935 to set a target route Rgt based on the registered parking position Ppark_reg, and performs, at a step 2940, the various types of controls for moving the vehicle SV along the target route Rgt.

Thereafter, the CPU proceeds to a step 2945 to store in the RAM of the VCECU a rear bird's-eye view image as a "bird's-eye view image for inside feature point", the rear bird's-eye view image being acquired from the PVM-ECU 20 at a timing when the position estimating accuracy of the vehicle SV with respect to the registered parking position Ppark_reg has "first" become more than or equal to the accuracy threshold. It should be noted that the CPU repeats the processing from the step 2905 to the step 2940 until the position estimating accuracy becomes more than or equal to the accuracy threshold. Thereafter, the CPU proceeds to a step 2950 to determine whether or not the parking of the vehicle SV into the registered parking position Ppark_reg has been finished. When the CPU makes a "No" determination (S2950: No), the CPU returns to the step 2905. When the CPU makes an "Yes" determination at the step 2950 (S2950: Yes) in a midst of repeating the above processing, the CPU proceeds to the step 2995 to terminate the parking assist processing based on the peripheral/inside feature points, and proceeds to a step 2705 in FIG. 27.

When proceeding to the step 2705, the CPU updates the count value cnt of each of the feature points F (the entrance feature points Fe, the peripheral feature points Fp, and the inside feature points Fi). Specifically, when each of the feature points F is stored in the RAM of the VCECU as the detection-finished feature point Fd (the detection-finished entrance feature point Fed, the detection-finished peripheral feature point Fpd, and the detection-finished inside feature point Fid), the CPU updates the count value cnt thereof in accordance with the expression (1). On the other hand, when each of the feature points F is stored in the RAM of the VCECU as the feature point F, the CPU updates the count value cnt thereof in accordance with the expression (2). The CPU stores in the non-volatile memory of the VCECU the updated count value cnt of each feature point F in association with each feature point F.

Thereafter, the CPU proceeds to a step 2710 to determine whether or not there are any feature points F, each having the count value cnt=0. When the CPU makes a "No" determination (S2710: No), the CPU proceeds to a step 2795 to finish the parking assist mode. In contrast, when the CPU makes an "Yes" determination at the step 2710 (S2710: Yes), the CPU erases, at a step 2715, the feature point(s) F having the count value cnt=0 from the non-volatile memory.

Subsequently, the CPU proceeds to a step 2720 to read the "bird's-eye view image for entrance feature point" and the "bird's-eye view image for inside feature point", each stored in the RAM of the VCECU as well as acquires from the PVM-ECU 20 the right, left, and front bird's-eye view images as "bird's-eye view images for peripheral feature point" (hereinafter, these bird's-eye view images may be also collectively referred to as "bird's-eye view images for feature point"). Thereafter, the CPU determines, in the "bird's-eye view images for feature point", whether or not a new feature point(s) F is extractable from the same divided region as the divided region where the erased feature point(s) F had been included.

When the CPU makes an "Yes" determination at the step 2720 (S2720: Yes), the CPU proceeds to a step 2725 to extract a new feature point(s) F from the same divided region, and stores in the non-volatile memory of the VCECU the gray level information, the coordinate (x, z), and the angle θ of each thereof in association with the initial value (=5) of the count value cnt. Thereafter, the CPU proceeds to the step 2795 to finish the parking assist mode.

On the other hand, when the CPU makes a "No" determination at the step 2720 (S2720: No), the CPU proceeds to a step 2730 to extract a new feature point(s) F from the whole "bird's-eye view images for feature point", and stores in the non-volatile memory of the VCECU the gray level information, the coordinate (x, z), and the angle θ of each thereof in association with the initial value (=5) of the count value cnt. Thereafter, the CPU proceeds to the step 2795 to finish the parking assist mode.

Effects of the present embodiment apparatus will be described. In the present embodiment apparatus, when a situation (hereinafter, may be also referred to as a "non-detected situation") has occurred consecutively a predetermined number of times (4 times or 5 times), the situation being a situation where one or more feature points F among the registered feature points are not detected even once from the bird's-eye view image(s) while the parking assist control is being performed owing to the one or more feature points applying to either one of the cases 1 to 3, the one or more feature points F are erased from the non-volatile memory (i.e. where a group of the registered feature points are stored) of the VCECU. In this case, the same number of feature points F as the erased one or more feature points F are newly extracted from the "bird's-eye view images for feature point", and the gray level information, the coordinate (x, z), and the angle θ of each thereof is stored in this non-volatile memory. Therefore, it can be prevented that a number of the feature points F detectable from the bird's-eye view image (s) continues to decrease. Accordingly, it becomes possible to calculate the registered parking position Ppark_reg with high accuracy based on the detectable feature points F, and as a result, it becomes possible to properly park the vehicle in the registered parking position Ppark_reg (That is, it becomes possible to properly perform the parking assist mode.).

In addition, in the present embodiment apparatus, as described above, also when the non-detected situation has occurred consecutively a predetermined number of times owing to the feature points F applying to the case 3, these feature points F are erased from the non-volatile memory of the VCECU. Therefore, for example, when it becomes common (often happens) that a position of the vehicle SV (refer to the position P2 in FIG. 17) when the parking assist mode is started is shifted from a position of the vehicle SV (refer to the position P1 in FIG. 11) when the entrance feature points Fe are extracted at the registration mode, an entrance feature point(s) Fe that applies to the case 3 (i.e., the out-of-area entrance feature point(s) Feo) is eventually erased, and a new entrance feature point(s) Fe is extracted from a "bird's-eye view image for entrance feature point corresponding to a position of the vehicle SV where the driver tends to stop when starting the parking assist mode". Therefore, a distribution area of the feature points F can be updated each time to an area where a driver's habit is more reflected. As a result, it becomes possible to always maintain the calculation accuracy of the registered parking position Ppark_reg at a high level.

Modification Example

A parking assist apparatus (hereinafter, referred to as a "present modification apparatus") according to a modification example of the present invention will be described. The present modification apparatus is different from the present embodiment apparatus in the method for updating the count value cnt of each of the feature points F. Therefore, different points from the present embodiment apparatus will be described below.

In the present embodiment apparatus, the following configuration is adopted where when the count value cnt of a feature point(s) F has become 0 owing to this feature point(s) F applying to either one of the cases 1 to 3, this feature point(s) F is erased. Here, the case 1 is a case where an inappropriate feature point(s) F is extracted at the registration mode, and therefore a possibility that a feature point(s) F that applies to the case 1 is detected at the parking assist mode is extremely low. In addition, the case 2 is a case where a condition of the ground 90 has changed with time between at the registration mode and at the parking assist mode, and thus a possibility that a feature point(s) F that applies to the case 2 is detected at the parking assist mode is extremely low. In contrast, the case 3 is a case where a feature point(s) F extracted at the registration mode is not included in a capturing area at the parking assist mode. Therefore, a feature point(s) F that applies to the case 3 is neither inappropriate as a feature point(s) F nor a feature point(s) F which comes not to be detected due to a condition thereof having changed with time. In other words, there is a possibility that even when a certain feature point F is not detected in one parking assist control owing to this feature point F applying to the case 3, this feature point F may be detected (included in the capturing area of the bird's-eye view image(s)) in another parking assist control.

Therefore, in the present modification apparatus, a following configuration is adopted where the count value cnt of a feature point F is maintained when this feature point F is not detected owing to applying to the case 3. Specifically, when a certain feature point F has been detected even once while the parking assist control is being performed, the VCECU stores in the RAM this feature point F as a detection-finished feature point Fd. On the other hand, when a certain feature point F has not been detected even once while the parking assist control is being performed and this feature point F applies to the case 3 (that is, when this feature point F is not included in the capturing area of the bird's-eye view image even once), the VCECU stores in the RAM this feature point F as an out-of-area feature point Fo. In addition, when a certain feature point F has not been detected even once in spite of being included in the capturing area of the bird's-eye view image while the parking assist control is being performed, the VCECU stores in the RAM this feature point F as a simple feature point F.

When a certain feature point F is stored in the RAM as the detection-finished feature point Fd, the VCECU updates the count value cnt of this feature point F in accordance with a following expression (3). When a certain feature point F is stored in the RAM as the simple feature point F, the VCECU updates the count value cnt of this feature point F in accordance with a following expression (4). When a certain feature point F is stored in the RAM as the out-of-area feature point Fo, the VCECU updates the count value cnt of this feature point F in accordance with a following expression (5).

$$cnt = \min(5, cnt + 3) \quad (3)$$

$$cnt = cnt - 1 \quad (4)$$

$$cnt = cnt \quad (5)$$

It should be noted that the initial value of the count value cnt and numbers used in the expression (3) are not limited to the values mentioned above, but may be changed accordingly. In addition, a following expression of cnt=N (N: a predetermined integer) may be adopted instead of the expression (3). Processing after the count value cnt is updated is same as the processing in the present embodiment apparatus, and thus a description thereof will be omitted.

<Specific Operation>

Figure 30:
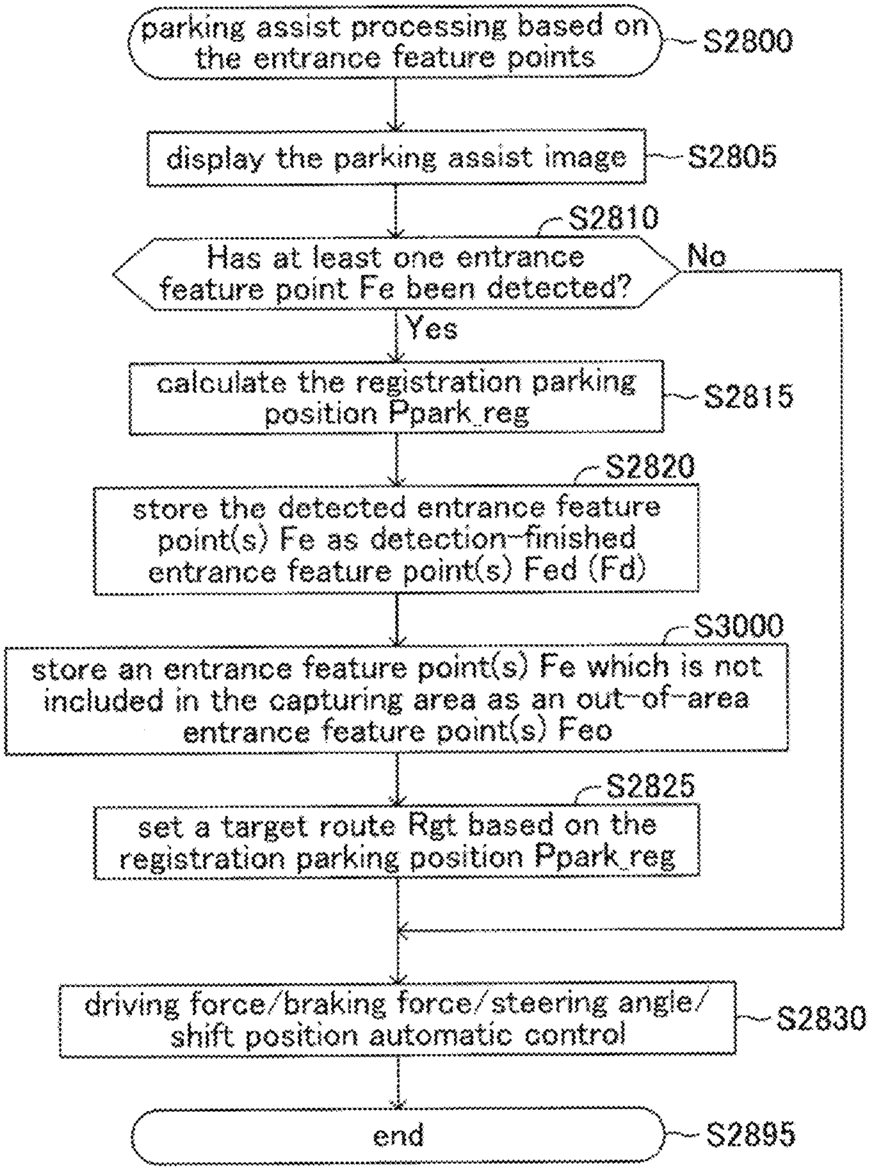
FIG. 30 is a flowchart showing a routine of the parking assist processing based on the entrance feature points among the parking assist mode performed by the CPU of the vehicle control ECU of a parking assist apparatus according to a modification example of the present invention.
Figure 31:
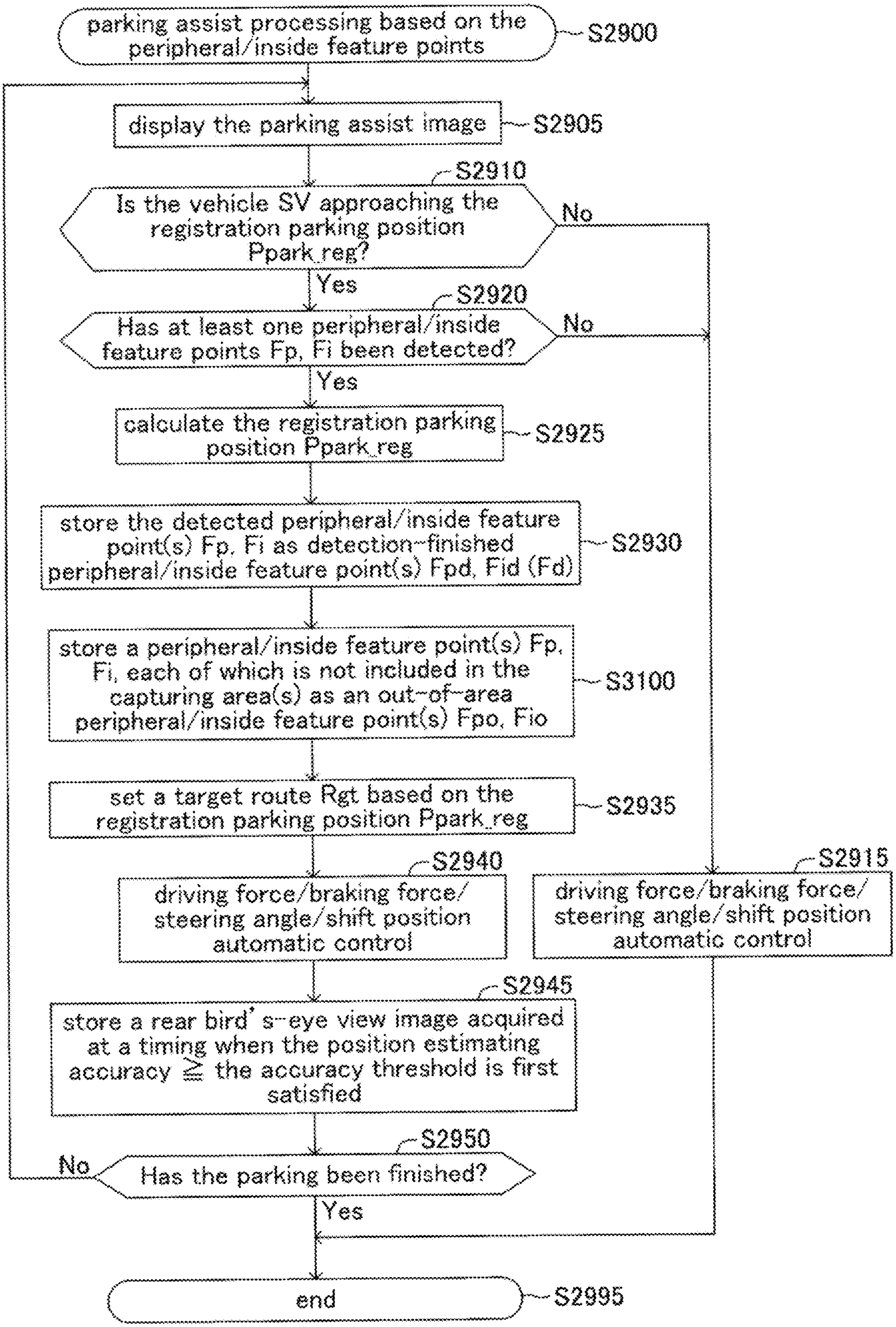
FIG. 31 is a flowchart showing a routine of the parking assist processing based on the peripheral/inside feature points among the parking assist mode performed by the CPU.

In the present modification apparatus, the CPU is configured to execute routines shown by flowcharts in FIG. 30 and FIG. 31, respectively, instead of the routines in FIG. 28 and FIG. 29.

The routine in FIG. 30 is different from the routine in FIG. 28 in that a step 3000 is added between the step 2820 and the step 2825 of the routine in FIG. 28. That is, after the processing at the step 2820 is finished, the CPU proceeds to the step 3000 to store in the RAM of the VCECU, as an "out-of-area entrance feature point(s) Feo", an entrance feature point(s) Fe which is not included in the capturing area 83 of the right bird's-eye view image or in the capturing area 84 of the left bird's-eye view image among entrance feature points Fe other than the detection-finished entrance feature point(s) Fed. Thereafter, the CPU proceeds to the step 2825. It should be noted that when some out-of-area entrance feature point(s) Feo is detected later by the determination at the step 2810 (S2810: Yes), this out-of-area entrance feature point(s) Feo is stored in the RAM of the VCECU as the detection-finished entrance feature point(s) Fed at the step 2820.

The routine in FIG. 31 is different from the routine in FIG. 29 in that a step 3100 is added between the step 2930 and the step 2935 of the routine in FIG. 29. That is, after the processing at the step 2930 is finished, the CPU proceeds to the step 3100 to store in the RAM of the VCECU, as an "out-of-area peripheral feature point(s) Fpo" and an "out-of-area inside feature point(s) Fio", respectively, a peripheral feature point(s) Fp and an inside feature point(s) Fi, each of which is not included in the capturing area(s) of any bird's-eye view images (especially, the right, left, and rear bird's-eye view images) among peripheral feature points Fp other than the detection-finished peripheral feature point(s) Fpd and inside feature points Fi other than the detection-finished inside feature point(s) Fid. Thereafter, the CPU proceeds to the step 2935. It should be noted that when some out-of-area peripheral feature point(s) Fpo and/or some out-of-area inside feature point(s) Fio is detected later by the determination at the step 2920 (S2920: Yes), this out-of-area peripheral/inside feature point(s) Fpo, Fio is stored in the RAM of the VCECU as the detection-finished peripheral/inside feature point(s) Fpd, Fid at the step 2930.

The present modification apparatus is different from the present embodiment apparatus in the processing at the step 2705 in FIG. 27. Specifically, when proceeding to the step 2705, the CPU updates the count value cnt of each of the feature points F (the entrance/peripheral/inside feature points Fe, Fp, Fi). Specifically, when each of the feature points F is stored in the RAM of the VCECU as the detection-finished feature point Fd (the detection-finished entrance/peripheral/inside feature point Fed, Fpd, Fid), the CPU updates the count value cnt thereof in accordance with the expression (3). On the other hand, when each of the feature points F is stored in the RAM as the simple feature point F, the CPU updates the count value cnt thereof in accordance with the expression (4). In addition, when each of the feature points F is stored in the RAM as the out-of-area feature point Fo (the out-of-area entrance/peripheral/inside feature point Feo, Fpo, Fio), the CPU updates the count value cnt thereof in accordance with the expression (5). The CPU stores in the non-volatile memory of the VCECU the updated count value cnt of each feature point F in association with each feature point F.

Effects of the present modification apparatus will be described. In the present modification apparatus, when the non-detected situation has occurred owing to a feature point(s) F applying to the case 3, this feature point(s) F is not erased regardless of the number of times the non-detected situation has consecutively occurred. That is, in the present modification apparatus, only when the non-detected situation has occurred consecutively a predetermined number of times owing to a feature point(s) F applying to the case 1 or the case 2, this feature point(s) F is erased. Therefore, according to the present modification apparatus, it becomes possible to selectively erase only a feature point(s) F which is not obviously qualified as a feature point(s) F (that is, a feature point(s) F that applies to the case 1 or the case 2).

The parking assist apparatuses according to the embodiment and the modification example of the present invention have been described. However, the present invention is not limited thereto and may adopt various modifications within a scope of the present invention. For example, the present embodiment and modification apparatuses may comprise a non-illustrated voice recognizer, and a part or all of the touching operation may be replaced with voice operation by the driver.

The invention claimed is:

1. A parking assist apparatus comprising:
- a camera capable of taking an image of a surrounding of a vehicle; and
- a controller configured to:
  - extract feature points from a captured image where a region in which a driver of said vehicle desires to register a parking position and a vicinity thereof are captured;
  - register said extracted feature points in association with said parking position, and thereby register said parking position as a registered parking position;
  - when it is determined that at least one of said feature points is detectable from said captured image in a case when said vehicle is positioned in said vicinity of said registered parking position, identify said registered parking position by detecting said at least one of said feature points;
  - perform, as parking assist control, either one of control for automatically parking said vehicle in said identified registered parking position or control for assisting in parking said vehicle in said identified registered parking position;
  - perform said parking assist control without using one or more feature points which are not detected from said captured image among said feature points which have been registered in association with said registered parking position; and
  - when said one or more feature points are undetected in consecutive operations of performing said parking assist control at said identified registered parking position, erase said one or more feature points from a group of said registered feature points.

2. The parking assist apparatus according to claim 1, wherein said controller is configured to:
- when a non-detected situation has occurred at least once, said non-detected situation being a situation where one or more feature points among said registered feature points are not detected from said captured image in identifying said registered parking position while said parking assist control is being performed, erase said one or more feature points from said group of said registered feature points.

3. The parking assist apparatus according to claim 2, wherein:
- when said non-detected situation has occurred at least once, said controller is configured to newly extract one or more feature points from said captured image, and register said newly extracted one or more feature points in association with said registered parking position.

4. The parking assist apparatus according to claim 3, wherein:
- when said non-detected situation has occurred at least once, said controller is configured to newly extract a number of feature points from said captured image, said number being greater than or equal to one and less than or equal to a number of feature points erased from said group of registered feature points.

5. The parking assist apparatus according to claim 4, wherein:
- when said non-detected situation has occurred at least once, said controller is configured to newly extract a same number of feature points as erased from said group of registered feature points, from said captured image.

6. The parking assist apparatus according to claim 3, wherein:

when said non-detected situation has occurred at least once, said controller is configured to newly extract said one or more feature points from each predetermined area where each of said erased feature points is included.

7. The parking assist apparatus according to claim 6, wherein:

when said non-detected situation has occurred at least once, said controller is configured to newly extract said one or more feature points from a same divided region as a divided region where each of said erased feature points is included among divided regions, each being defined by dividing said captured image into a plurality of regions.

8. The parking assist apparatus according to claim 3, wherein:

when said non-detected situation has occurred at least once, said controller is configured to newly extract said one or more feature points from each of divided regions, each being defined by dividing said captured image into a plurality of regions.

9. The parking assist apparatus according to claim 2, wherein:

when said non-detected situation has occurred owing to a feature point not being included in a capturing area of said captured image, said controller is configured not to erase this feature point from said group of said registered feature points.

* * * * *